United States Patent
Stanwood et al.

(10) Patent No.: US 11,197,290 B2
(45) Date of Patent: *Dec. 7, 2021

(54) PACKING SOURCE DATA PACKETS INTO TRANSPORTING PACKETS WITH FRAGMENTATION

(71) Applicant: Wi-LAN Inc., Ottawa (CA)

(72) Inventors: Kenneth L. Stanwood, Carlsbad, CA (US); Stanley Wang, San Diego, CA (US); Robert M. Johnson, San Diego, CA (US)

(73) Assignee: WI-LAN INC., Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/013,182

(22) Filed: Sep. 4, 2020

(65) Prior Publication Data

US 2020/0404637 A1    Dec. 24, 2020

Related U.S. Application Data

(63) Continuation of application No. 15/160,065, filed on May 20, 2016, now Pat. No. 10,772,086, which is a
(Continued)

(51) Int. Cl.
*H04W 72/04* (2009.01)
*H04W 28/02* (2009.01)
(Continued)

(52) U.S. Cl.
CPC ......... *H04W 72/042* (2013.01); *H04L 1/0003* (2013.01); *H04L 1/0042* (2013.01);
(Continued)

(58) Field of Classification Search
None
See application file for complete search history.

(56) References Cited

U.S. PATENT DOCUMENTS

| | | | |
|---|---|---|---|
| 3,949,404 A | 4/1976 | Fletcher et al. | |
| 4,495,619 A | 1/1985 | Acampora | |

(Continued)

FOREIGN PATENT DOCUMENTS

| | | |
|---|---|---|
| EP | 622924 A2 | 11/1994 |
| EP | 720405 A2 | 7/1996 |

(Continued)

OTHER PUBLICATIONS

Xylomenos et al. "Link Layer Support for Quality of Service on Wireless Internet Links." IEEE Personal Communications. Oct. 1999. pp. 52-60.

(Continued)

*Primary Examiner* — Gregory B Sefcheck
(74) *Attorney, Agent, or Firm* — Procopio, Cory, Hargreaves & Savitch LLP; Richard E. Campbell

(57) ABSTRACT

A communication system and method are disclosed for transmitting packets of information in at least one first format over a communications link that utilizes packets of information in a second format. In certain embodiments, the packets of information in a first format are converted to packets of information in the second format prior to transmission via the communications link by packing and fragmenting the information in the first format in a coordinated manner. Embodiments may also utilize packing subheaders and fragmentation control bits in the packing and fragmentation processes.

11 Claims, 14 Drawing Sheets

Related U.S. Application Data continuation of application No. 14/831,387, filed on Aug. 20, 2015, now Pat. No. 9,374,733, which is a continuation of application No. 12/886,323, filed on Sep. 20, 2010, now Pat. No. 9,119,095, which is a continuation of application No. 10/053,179, filed on Jan. 15, 2002, now Pat. No. 8,009,667.

(60) Provisional application No. 60/262,005, filed on Jan. 16, 2001.

(51) Int. Cl.
| | | |
|---|---|---|
| *H04L 29/06* | (2006.01) | |
| *H04W 76/10* | (2018.01) | |
| *H04W 28/06* | (2009.01) | |
| *H04L 1/00* | (2006.01) | |
| *H04L 5/00* | (2006.01) | |

(52) U.S. Cl.
CPC .............. *H04L 69/04* (2013.01); *H04L 69/22* (2013.01); *H04W 28/0205* (2013.01); *H04W 28/0263* (2013.01); *H04W 28/065* (2013.01); *H04W 72/04* (2013.01); *H04W 72/0446* (2013.01); *H04W 76/10* (2018.02); *H04L 5/0044* (2013.01)

(56) References Cited

U.S. PATENT DOCUMENTS

| | | |
|---|---|---|
| 4,742,512 A | 5/1988 | Akashi et al. |
| 4,931,250 A | 6/1990 | Greszczuk |
| 4,975,906 A | 12/1990 | Takiyasu et al. |
| 5,130,983 A | 7/1992 | Heffner |
| 5,157,395 A | 10/1992 | Del Signore et al. |
| 5,274,841 A | 12/1993 | Natarajan et al. |
| 5,297,144 A | 3/1994 | Gilbert et al. |
| 5,402,422 A | 3/1995 | Liu et al. |
| 5,404,374 A | 4/1995 | Mullins et al. |
| 5,412,651 A | 5/1995 | Gorshe |
| 5,420,851 A | 5/1995 | Seshadri et al. |
| 5,444,698 A | 8/1995 | Kito |
| 5,457,687 A | 10/1995 | Newman |
| 5,511,082 A | 4/1996 | How et al. |
| 5,517,503 A | 5/1996 | Hess |
| 5,533,004 A | 7/1996 | Jasper et al. |
| 5,548,541 A | 8/1996 | Bierman et al. |
| 5,570,355 A | 10/1996 | Dail et al. |
| 5,602,868 A | 2/1997 | Wilson |
| 5,615,212 A | 3/1997 | Ruszczyk et al. |
| 5,638,371 A | 6/1997 | Raychaudhuri et al. |
| 5,638,374 A | 6/1997 | Heath |
| 5,640,399 A * | 6/1997 | Rostoker ............. H04L 12/4625 370/392 |
| 5,654,968 A | 8/1997 | Smiroldo |
| 5,666,358 A | 9/1997 | Paratore et al. |
| 5,675,573 A | 10/1997 | Karol et al. |
| 5,677,909 A | 10/1997 | Heide |
| 5,684,791 A | 11/1997 | Raychaudhuri et al. |
| 5,699,365 A | 12/1997 | Klayman et al. |
| 5,706,428 A | 1/1998 | Boer et al. |
| 5,742,592 A | 4/1998 | Scholefield et al. |
| 5,742,847 A | 4/1998 | Knoll et al. |
| 5,751,708 A | 5/1998 | Eng et al. |
| 5,752,193 A | 5/1998 | Scholefield et al. |
| 5,764,699 A | 6/1998 | Needham et al. |
| 5,768,254 A | 6/1998 | Papadopoulos et al. |
| 5,774,461 A | 6/1998 | Hyden et al. |
| 5,774,469 A | 6/1998 | Wirkestrand |
| 5,809,427 A | 9/1998 | Perreault et al. |
| 5,818,842 A | 10/1998 | Burwell et al. |
| 5,828,695 A | 10/1998 | Webb |
| 5,844,906 A | 12/1998 | Khelghatti et al. |
| 5,859,619 A | 1/1999 | Wu et al. |
| 5,859,848 A | 1/1999 | Miura et al. |
| 5,870,394 A | 2/1999 | Oprea |
| 5,890,055 A | 3/1999 | Chu et al. |
| 5,909,469 A | 6/1999 | Frodigh et al. |
| 5,912,920 A | 6/1999 | Marchok et al. |
| 5,914,950 A | 6/1999 | Tiedemann, Jr. et al. |
| 5,918,171 A | 6/1999 | Funke et al. |
| 5,923,650 A | 7/1999 | Chen et al. |
| 5,930,265 A | 7/1999 | Duault et al. |
| 5,946,313 A | 8/1999 | Allan et al. |
| 5,963,543 A | 10/1999 | Rostoker et al. |
| 5,970,062 A | 10/1999 | Bauchot |
| 5,987,034 A | 11/1999 | Simon et al. |
| 6,006,069 A | 12/1999 | Langston |
| 6,011,786 A | 1/2000 | Dent |
| 6,016,311 A | 1/2000 | Gilbert et al. |
| 6,016,313 A | 1/2000 | Foster, Jr. et al. |
| 6,016,401 A | 1/2000 | Rostoker et al. |
| 6,026,133 A | 2/2000 | Sokoler |
| 6,028,860 A | 2/2000 | Laubach et al. |
| 6,031,827 A | 2/2000 | Rikkinen et al. |
| 6,038,455 A | 3/2000 | Gardner et al. |
| 6,041,051 A | 3/2000 | Doshi et al. |
| 6,064,678 A | 5/2000 | Sindhushayana et al. |
| 6,075,787 A | 6/2000 | Bobeck et al. |
| 6,094,421 A | 7/2000 | Scott |
| 6,112,080 A | 8/2000 | Jensen et al. |
| 6,115,390 A | 9/2000 | Chuah |
| 6,122,293 A | 9/2000 | Frodigh et al. |
| 6,125,148 A | 9/2000 | Frodigh et al. |
| 6,128,293 A | 10/2000 | Pfeffer |
| 6,147,989 A | 11/2000 | Esaki et al. |
| 6,151,318 A | 11/2000 | Woodward et al. |
| 6,163,547 A | 12/2000 | De Vriendt et al. |
| 6,167,031 A | 12/2000 | Olofsson et al. |
| 6,172,988 B1 | 1/2001 | Tiernan et al. |
| 6,188,680 B1 | 2/2001 | Ohki |
| 6,189,041 B1 | 2/2001 | Cox et al. |
| 6,198,728 B1 | 3/2001 | Hulyalkar et al. |
| 6,201,811 B1 | 3/2001 | Larsson et al. |
| 6,201,813 B1 | 3/2001 | Klausmeier et al. |
| 6,208,873 B1 | 3/2001 | Black et al. |
| 6,233,231 B1 | 5/2001 | Felix et al. |
| 6,243,382 B1 | 6/2001 | O'Neill et al. |
| 6,252,865 B1 | 6/2001 | Walton et al. |
| 6,298,049 B1 | 10/2001 | Vanhoof et al. |
| 6,327,254 B1 | 12/2001 | Chuah |
| 6,339,585 B1 | 1/2002 | Hulyalkar et al. |
| 6,351,499 B1 | 2/2002 | Paulraj et al. |
| 6,359,934 B1 | 3/2002 | Yoshida |
| 6,366,961 B1 | 4/2002 | Subbiah et al. |
| 6,370,112 B1 | 4/2002 | Voelker |
| 6,377,782 B1 | 4/2002 | Bishop et al. |
| 6,381,228 B1 | 4/2002 | Prieto et al. |
| 6,392,994 B1 | 5/2002 | Dubuc |
| 6,393,012 B1 | 5/2002 | Pankaj |
| 6,400,755 B1 | 6/2002 | Harris et al. |
| 6,434,164 B1 | 8/2002 | Matsunaga et al. |
| 6,452,927 B1 | 9/2002 | Rich |
| 6,452,964 B1 | 9/2002 | Yoshida |
| 6,463,107 B1 | 10/2002 | Lindoff et al. |
| 6,469,991 B1 | 10/2002 | Chuah |
| 6,483,854 B1 | 11/2002 | Klausmeier et al. |
| 6,493,331 B1 | 12/2002 | Walton et al. |
| 6,493,342 B1 | 12/2002 | Breslow et al. |
| 6,496,142 B1 | 12/2002 | Iinuma |
| 6,546,017 B1 | 4/2003 | Khaunte |
| 6,549,759 B2 | 4/2003 | Arviv et al. |
| 6,567,383 B1 | 5/2003 | Bohnke |
| 6,587,885 B1 | 7/2003 | Nakayama et al. |
| 6,608,841 B1 | 8/2003 | Koodli |
| 6,621,804 B1 | 9/2003 | Holtzman et al. |
| 6,621,812 B1 | 9/2003 | Chapman et al. |
| 6,631,130 B1 | 10/2003 | Roy et al. |
| 6,650,624 B1 | 11/2003 | Quigley et al. |
| 6,665,292 B1 | 12/2003 | Bradshaw et al. |
| 6,665,296 B1 | 12/2003 | Sturza et al. |
| 6,671,328 B1 | 12/2003 | Poon et al. |
| 6,674,731 B1 | 1/2004 | Bradshaw et al. |
| 6,683,866 B1 | 1/2004 | Stanwood et al. |

(56) References Cited

U.S. PATENT DOCUMENTS

| | | |
|---|---|---|
| 6,697,364 B1 | 2/2004 | Kekki et al. |
| 6,711,176 B1 | 3/2004 | Pezeshki-Esfahani |
| 6,714,562 B1 | 3/2004 | Calvignac et al. |
| 6,721,286 B1 | 4/2004 | Williams et al. |
| 6,741,614 B1 | 5/2004 | Porter et al. |
| 6,747,977 B1 | 6/2004 | Smith et al. |
| 6,754,217 B1 * | 6/2004 | Ahn .................... H04L 12/5601 370/395.6 |
| 6,760,599 B1 | 7/2004 | Uhlik |
| 6,771,660 B1 | 8/2004 | Bourlas et al. |
| 6,785,252 B1 | 8/2004 | Zimmerman et al. |
| 6,804,202 B1 | 10/2004 | Hwang |
| 6,804,251 B1 | 10/2004 | Limb et al. |
| 6,842,437 B1 | 1/2005 | Heath |
| 6,862,622 B2 | 3/2005 | Jorgensen |
| 6,870,932 B2 | 3/2005 | Jiang |
| 6,907,048 B1 | 6/2005 | Treadaway et al. |
| 6,917,614 B1 | 7/2005 | Laubach et al. |
| 6,918,034 B1 | 7/2005 | Sengodan et al. |
| 6,925,068 B1 | 8/2005 | Stanwood et al. |
| 6,931,030 B1 | 8/2005 | Dogan |
| 6,940,823 B1 | 9/2005 | Park et al. |
| 6,940,915 B2 | 9/2005 | Tang |
| 6,944,672 B2 | 9/2005 | Crow et al. |
| 6,963,751 B1 | 11/2005 | Kordsmeyer et al. |
| 6,968,554 B1 | 11/2005 | Macdonald et al. |
| 6,970,941 B1 | 11/2005 | Caronni et al. |
| 7,006,525 B1 | 2/2006 | Jha |
| 7,006,526 B1 | 2/2006 | Biederman |
| 7,020,141 B1 | 3/2006 | Stacey et al. |
| 7,020,715 B2 | 3/2006 | Venkataraman et al. |
| 7,031,281 B1 | 4/2006 | Zhang |
| 7,050,407 B1 | 5/2006 | Frazer et al. |
| 7,061,935 B1 | 6/2006 | Roy et al. |
| 7,068,639 B1 | 6/2006 | Varma et al. |
| 7,085,291 B2 | 8/2006 | Zhang et al. |
| 7,197,022 B2 | 3/2007 | Stanwood et al. |
| 7,230,931 B2 | 6/2007 | Struhsaker |
| 7,260,405 B2 | 8/2007 | Kim et al. |
| 7,321,569 B2 | 1/2008 | Takagi et al. |
| 7,359,403 B1 | 4/2008 | Rinne |
| 7,433,334 B2 | 10/2008 | Marjelund et al. |
| 7,443,814 B2 | 10/2008 | Agarwal et al. |
| 7,471,620 B2 | 12/2008 | Alazraki et al. |
| 7,570,645 B2 | 8/2009 | Agarwal |
| 7,583,623 B2 | 9/2009 | Zimmerman et al. |
| 7,583,699 B2 | 9/2009 | Hwang |
| 7,602,917 B2 | 10/2009 | Vialen et al. |
| 7,646,756 B1 | 1/2010 | Ho et al. |
| 7,873,075 B2 * | 1/2011 | Rinne .................... H04L 69/32 370/469 |
| 8,311,040 B2 | 11/2012 | Stanwood et al. |
| 8,457,145 B2 | 6/2013 | Zimmerman et al. |
| 8,462,723 B2 | 6/2013 | Stanwood et al. |
| 8,462,761 B2 | 6/2013 | Spinar et al. |
| 8,537,757 B2 | 9/2013 | Arviv et al. |
| 8,615,020 B2 | 12/2013 | Spinar et al. |
| 9,374,733 B2 | 6/2016 | Stanwood et al. |
| 2001/0015985 A1 | 8/2001 | Van Grinsven et al. |
| 2001/0033582 A1 * | 10/2001 | Sarkkinen .......... H04W 92/045 370/474 |
| 2001/0048681 A1 | 12/2001 | Bilic et al. |
| 2002/0016852 A1 | 2/2002 | Nishihara |
| 2002/0089984 A1 | 7/2002 | Jiang |
| 2002/0090005 A1 | 7/2002 | Jiang et al. |
| 2002/0126677 A1 | 9/2002 | Hathaway et al. |
| 2003/0169722 A1 | 9/2003 | Petrus et al. |
| 2004/0132459 A1 | 7/2004 | Varma et al. |
| 2005/0100120 A1 | 5/2005 | Barton et al. |
| 2005/0220110 A1 | 10/2005 | Agarwal |
| 2006/0062250 A1 | 3/2006 | Payne |
| 2006/0148483 A1 | 7/2006 | Howard et al. |
| 2006/0262808 A1 | 11/2006 | Lin et al. |
| 2008/0081651 A1 | 4/2008 | Kuroda et al. |

FOREIGN PATENT DOCUMENTS

| | | |
|---|---|---|
| EP | 507384 B1 | 7/1998 |
| EP | 891060 A2 | 1/1999 |
| EP | 845916 B1 | 3/2005 |
| EP | 944200 B1 | 6/2009 |
| JP | 11266231 A | 9/1999 |
| WO | 9222162 A1 | 12/1992 |
| WO | 9713388 A1 | 4/1997 |
| WO | 9810568 A1 | 3/1998 |
| WO | 99012303 A1 | 3/1999 |
| WO | 99018685 A1 | 4/1999 |
| WO | 9938343 A2 | 7/1999 |
| WO | 9939532 A1 | 8/1999 |
| WO | 0001188 A1 | 1/2000 |

OTHER PUBLICATIONS

Lin et al. "Error Control Coding, Fundamentals and Applications." Prentice-Hall Computer Applications in Electrical Engineering Series., 1993, pp. 315-349.

Matsuoka et al. "Adaptive Modulation System with Variable Coding Rate Concatenated Code for High Quality Multi-Media Communication Systems." Apr. 28, 1996. IEEE. pp. 487-491.

Microsoft Corporation. Microsoft Windows 2000 Server. "Quality of Service Technical White Paper." 1999. 51 pages.

Mollenauer et al. "MAC Proposal for IEEE 802.16.1." Apr. 14, 2000 (Revision 1: Apr. 26, 2000). 103 pages.

Mollenauer et al. "MAC Proposal for IEEE 802.16.1." Dec. 24, 1999.

Mollenauer et al. "MAC Proposal for IEEE 802.16.1." Feb. 25, 2000. 98 pages.

Mollenauer et al. "MAC Proposal for IEEE 802.16.1." Jan. 5, 2000. 92 pages.

Mollenauer. "An Efficient Media Access Control Protocol for Broadband Wireless Access Systems." IEEE 802.16mc-99/10. IEEE 802.16 Broadband Wireless Access Working Group. Oct. 28, 1999.

Muneta et al. "A New Frequency-Domain Link Adaptation Scheme for Broadband OFDM Systems." IEEE, 1999. pp. 253-257.

Narlikar et al. "Designing Multihop Wireless Backhand Networks with Delay Guarantees." Bell Labs, 2005.

Notice of Allowance for U.S. Appl. No. 09/430,379 dated Jul. 28, 2003.

Office Action issued in U.S. Appl. No. 09/430,379 dated Jan. 15, 2003.

Papadopoulos et al. "Reduction of Mixed Co-channel Interference in Microcellular STDD Systems." Vehicular Technology Conference. 1995 IEEE 45.sup.th, vol. 2, pp. 759-763.

Passas et al. "MAC protocol and traffic scheduling for wireless ATM networks." Mobile Networks and Applications. May 2001, 28 pages.

Petras. "MAC Protocol for Wireless ATM: contention free versus contention based transmission of reservation requests." IEEE, 1996. pp. 903-907.

Pons et al. "Bit Error Rate Characterisation and Modelling for GSM." IEEE 1998, pp. 3722-3727.

Qualcomm. "IFR3300 Rx IF/Baseband Processor." Sep. 2003. 2 pages.

Qualcomm. "MSM3000™ Mobile Station Modem Overview." Feb. 2003. 2 pages.

Qualcomm. "MSM3000™ Mobile Station Modem." Feb. 2003. 2 pages.

Qualcomm. "MSM3300™ Chipset Solution." Oct. 2003. 4 pages.

Qualcomm. "MSM5000™ Mobile Station Modem." Feb. 2001. 2 pages.

Qualcomm. "MSM5100™ Chipset Solution." Aug. 2004. 4 pages.

Qualcomm. "Qualcomm ASIC Products." CDMA ASIC Products Data Book. Sep. 1997. 132 pages.

Wolf et al. "On the Weight Distribution of Linear Block Codes Formed From Convolutional Codes." IEEE, IEEE Transactions on Communications, vol. 44, Sep. 9, 1996.

Qualcomm. "RX and TX IF/Baseband Processors. IFR3000/IFT3000." Jun. 2000. 4 pages.

(56) References Cited

OTHER PUBLICATIONS

Recommendation ITU-R M.1457-1. "Detailed Specifications of the Radio Interfaces of International Mobile Telecommunications." 2000. 247 pages.
Redl et al. "An Introduction to GSM." Artech House, Inc. 1995, pp. 84-85 and 95.
Sampei et al. "Adaptive Modulation/TDMA Scheme for Personal Multi-Media Communication System." Proceedings of the Global Telecommunications Conference, U.S., New York, IEEE Nov. 28, 1994, pp. 989-993.
Sarkar. "Digital Imaging with Wireless Data Services." VLSI Design 2000, Thirteenth International Conference on VLSI Design. Jan. 3-7, 2000, Science City, Calcutta, India.
Sater et al. "Media Access Control Layer Proposal for the 802.16.1 Air Interface Specification." IEEE 802.16 Broadband Wireless Access Working Group, Online! Jul. 7, 2000, XP002210334 retrieved from the Internet: <URL: http://wirelessman.org/tgl/mac/contrib/802161mc-00.sub.1321rl.pdf> retrieved Aug. 20, 2002, pp. 69-80.
"Sau et al. ""Scheduling and Quality of Service in the General Packet Radio Service."" IEEE 1998 International Conference on Universal Personal Communications. p. 1067-1071. Oct. 5-8, 1998, Florence, IT."
Shannon. "A Mathematical Theory of Communication." Bell System Technical Journal, pp. 379-423 (Part 1), 623-656 (Part 2), Jul. 1948.
stardust.com, Inc. "White Paper—QoS Protocols & Architectures." Jul. 8, 1999. 25 pages.
Torrance et al. "Upper bound performance of adaptive modulation in a slow Rayleigh fading channel." IEEE Electronics Letters 32(8):718-719, Apr. 11, 1996.
TS 03 64 v2.1.1, May 1997, "Digital cellular telecommunications system (Phase 2+); General Packet Radio Service (GPRS); Overall description of the GPRS Radio Interface; Stage 2." European Telecommunications Standards Institute (ETSI).
TS 04.65 v1.0.0, May 1997. "Digital cellular telecommunications system (Phase 2+); General Packet Radio Service (GPRS); Mobile Station (MS)—Serving GPRS Support Node (SGSN); Subnetwork Dependent Convergence Protocol (SNDCP) (GSM 04.65 version 1.0.0)." European Telecommunications Standards Institute.
U.S. District Court, Northern District of California, "Amended Complaint for Declaratory Judgment Demand for Jury Trial" filed Sep. 30, 2008 in Case No. 5:08-cv-4555.
Ue et al. "Symbol Rate and Modulation Level Controlled Adaptive Modulation/TDMA/TDD for Personal Communication Systems." Proceedings of the Vehicular Technology Conference, U.S., New York, IEEE, vol. Conf. 45, Jul. 25, 1995, pp. 306-310.
Ulm et al. "Data-Over-Cable Interface Specifications, Radio Frequency Interface Specification." Hewlett Packard Interim Specification, Doc. Control No. SP-RFII01-970321, published Mar. 21, 1997 by MCNS Holdings, L.P. Section 6, pp. 43-85.
United States District Court, Southern District of Florida. *Wi-LAN USA, Inc. and Wi-LAN, Inc.*, Plaintiffs, v. *Alcatel-Lucent USA Inc.*, Defendant. "Complaint" Entered Oct. 1, 2012. Case No. 1:12-cv-23568-CMA. 7 pages.
United States District Court, Southern District of Florida. *Wi-LAN USA, Inc. and Wi-LAN, Inc.*, Plaintiffs, v. *Apple Inc.*, Defendant. "Complaint." Entered Dec. 6, 2012. Case No. 1:12-cv-24318-KMM. 6 pages.
United States District Court, Southern District of Florida. *Wi-LAN USA, Inc. and Wi-LAN, Inc.*, Plaintiffs, v. *HTC Corporation, and HTC America, Inc.*, Defendants. "Complaint." Entered Dec. 6, 2012. Case No. 1:12-cv-24319-KMM. 6 pages.
United States District Court, Southern District of Florida. *Wi-LAN USA, Inc. and Wi-LAN, Inc.*, Plaintiffs, v. *Sierra Wireless America, Inc.*, Defendant. "Complaint." Entered Dec. 6, 2012. Case No. 1:12-cv-24320-KMM. 6 pages.
United States District Court, Southern District of Florida. *Wi-LAN USA, Inc. and Wi-LAN, Inc.*, Plaintiffs, v. *Telefonaktiebolaget LM Ericsson, and Ericsson Inc.*, Defendants. "Complaint." Entered Oct. 1, 2012. Case No. 1:12-cv-23569-DMM. 7 pages.
Universal Mobile Telecommunications System (UMTS); Radio Interface Protocol Architecture (3GPP TS 25.301 version 3.6.0 Release 1999) (TS 25.301). European Telecommunications Standards Institute (ETSI) Sep. 2000.
Universal Mobile Telecommunications System (UMTS); Radio Interface Protocol Architecture (3GPP TS 25.303 version 3.5.0 Release 1999) (TS 25.303). European Telecommunications Standards Institute (ETSI). Sep. 2000.
"Universal Mobile Telecommunications System (UMTS); Radio Interface Protocol Architecture (3GPP TS 25.321 version 3.5.0 Release 1999) (TS 25.321). European Telecommunications Standards Institute (ETSI) Sep. 2000."
Universal Mobile Telecommunications System (UMTS); Radio Interface Protocol Architecture (3GPP TS 25.322 version 3.4.0 Release 1999) (TS 25.322). European Telecommunications Standards Institute (ETSI). Sep. 2000.
Universal Mobile Telecommunications System (UMTS); Radio Interface Protocol Architecture (3GPP TS 25.323 version 3.3.0 Release 1999) (TS 25.323). European Telecommunications Standards Institute (ETSI). Sep. 2000.
*Wi-LAN, Inc.* v. *Apple Inc.* "Apple Inc.'s Identification of Prior Art Pursuant to 35 U.S.C. § 282." 3:14-cv-1507-DMS-BLM (consolidated) and 3:14-cv-2235-DMS-BLM (lead case). United States District Court for the Southern District of California. Jun. 22, 2018.
3GPP TS 03.60, "Digital cellular telecommunication system (Phase 2+); General Packet Radio Service (GPRS) Service Description, Stage 2" (GSM 03.60) European Telecommunications Standards Institute (ETSI) 1998.
3GPP TS 03.64, "Digital Cellular Telecommunications System (Phase 2+); General Packet Radio Service (GPRS) Overall Description of the GPRS Radio Interface; Stage 2" (GSM 03.64)European Telecommunications Standards Institute (ETSI) 1998.
3GPP TS 04.07, "Digital cellular telecommunications system (Phase 2+); Mobile radio interface signalling layer 3; General aspects" (GSM 04.07). European Telecommunications Standards Institute (ETSI). 1998.
3GPP TS 04.08, "Digital cellular telecommunications system (Phase2+), Mobile radio interface layer 3 specification" (GSM 04.08) European Telecommunications Standards Institute (ETSI)1998.
3GPP TS 04.60, "Digital cellular telecommunications system (Phase 2+); General Packet Radio Service (GPRS) Mobile Station (MS)—Base Station System (BSS) interface; Radio Link Control/Medium Access Control (RLC/MAC) protocol." Aug. 1998.
3GPP TS 04.60, "Digital cellular telecommunications system (Phase2+); General Packet Radio Service (GPRS) Mobile Station (MS)—Base Station System (BSS) interface; Radio Link Control/Medium Access Control (RLC/MAC) protocol" (GSM 04.60) European Telecommunications Standards Institute (ETSI) 2000.
"3GPP TS 04.64, "Digital cellular telecommunications system (Phase 2+); General Packet Radio Service (GPRS) Mobile Station—Serving GPRS Support Node (MS-SGSN) Logical Link Control (LLC) layer specification" (GSM 04.64). European Telecommunications Standards Institute (ETSI) 2000."
3GPP TS 04.65, "Digital cellular telecommunications system (Phase 2+); General Packet Radio Service (GPRS) Mobile Station (MS)—Serving GPRS Support Node (SGSN); Subnetwork Dependent Convergence Protocol (SNDCP)" (GSM 04.65). European Telecommunications Standards Institute (ETSI). 2001.
3GPP TS 25.301 v3.6.0, Sep. 2000, Technical Specification. 3rd Generation Partnership Project; Technical Specification Group Radio Access Network; Radio Interface Protocol Architecture (Release 1999).
3GPP TS 25.303 v3.5.0, Sep. 2000, Technical Specification. "3rd Generation Partnership Project; Technical Specification Group Radio Access Network; Interlayer Procedures in Connected Mode (Release 1999)."
3GPP TS 25.321 v3.5.0 (Sep. 2000) Technical Specification. "3rd Generation Partnership Project; Technical Specification Group Radio Access Network; MAC protocol specification (release 1999)."
3GPP TS 25.322 v3.4.0 (Sep. 2000) Technical Specification. "3rd Generation Partnership Project; Technical Specification Group Radio Access Network; RLC protocol specification (Release 1999)."

(56) References Cited

OTHER PUBLICATIONS

3GPP TS 25.323 v3.3.0 (Sep. 2000) Technical Specification. 3rd Generation Partnership Project; Technical Specification Group Radio Access Network; Packet Data Convergence Protocol (PDCP) Specification (Release 1999).
Andersen et al. "Prediction of Future Fading Based on Past Measurements." Vehicular Technology Conference, VTC 99, vol. 1, pp. 151-155.
Apple Inc. v. Wi-LAN, Inc. "Plaintiff Apple Inc.'s Amended Invalidity Contentions Pursuant to Patent Local Rules 3.3, 3.4, and 3.6." 3:14-cv-02235-DMS-BLM (lead case) and 3:14-cv-1507-DMS-BLM (consolidated). United States District Court for the Southern District of California. Jan. 2, 2018. Inclusive of all appendices.
Bauchot. "Mascara, a MAC Protocol for Wireless ATM." 1996. 5 pages.
Bender et al. "CDMA/HDR: A Bandwidth Efficient High Speed Wireless Data Service for Nomadic Users." Communications Magazine, IEEE. 38(7):70-77. Jul. 2000.
Butler et al. "The MSM3000TM dual-Mode CDMA + AMPS ASIC: for increased functionality and standby time of handsets." IEEE Radio Frequency Integrated Circuits Symposium, RFIC, Digest of Technical Papers. Feb. 1999. 5 pages.
Cable Television Laboratories, Inc., "Data-Over-Cable Service Interface Specifications Radio Frequency Interface Specification", SP-RFIv1.1-101-990311, 1999-2005, 320 pages.
Carvalho. "Quality of Service Controlled Multimedia Transport Protocol." Department of Electronic Engineering, Queen Mary and Westfield College, University of London. Nov. 2000. 185 pages.
Chuang. "An OFDM-Based System with Dynamic Packet Assignment and Interference Suppression for Advanced Cellular Internet Service." Wireless Personal Communications. 13:167-183 (2000).
Draft EN 301 349 V6.1.0 Aug. 1998, European Standard (Telecommunications Series). Digital cellular telecommunications system (Phase 2+); General Packet Radio Service (GPRS); Mobile Station (MS)—Base Station System (BSS) interface; Radio Link Control / Medium Access Control (RLC/MAC) protocol (GSM 04.60 version 6.1.0 Release 1997). ETSI.
Draft TS 04.64 v1.0.1, May 1997. "Digital cellular telecommunications system (Phase 2+); General Packet Radio Service (GPRS); Mobile Station (MS)—Serving GPRS Support Node (SGSN); Logical Link Control (LLC) Layer (GSM 04.64 version 1.0.1)." European Telecommunications Standards Institute.
Dutton. "Asynchronous Transfer Mode (ATM) Technical Overview." 2.sup.nd Edition, Prentice Hall, Oct. 1995, Chap. 3, pp. 21-25.
Ericsson et al. "Hybrid type-II ARQ/AMS supported by Channel Predictive Scheduling in a Multi-User Scenario." IEEE 38th Vehicular Technology Conference. Nov. 2000.
Ericsson. "Adaptive Modulation and Scheduling for Fading Channels." Global Telecommunications Conference (Globecom) 1999. pp. 2668-2672.
Ericsson. "Adaptive Modulation and Scheduling of IP traffic over Fading Channels." IEEE 1999. pp. 849-853.
Ermel et al. "Analytical Comparison of Different GPRS Introduction Strategies." 2000. 8 pages.
ETSI EN 301 344 v7.4.1 (Sep. 2000). "Digital cellular telecommuncation system (Phase 2+); General Packet Radio Service (GPRS) Service Description, Stage 2 (GSM 03.60 version 7.4.1 Release 1998)." 117 pages.
ETSI TS 101 349 V8.5.0 (Oct. 2000). "Digital cellular telecommunications system (Phase 2+); General Packet Radio Service (GPRS); Mobile Station (MS)—Base Station System (BSS) interface); Radio Link Control/Medium Access Control (RLC/MAC) protocol (GSM 04.60 version 8.5.0 Release 1999)." 278 pages.
ETSI TS 101 350 V8.6.0 (Sep. 2000). Digital cellular telecommunications system (Phase 2+); General Packet Radio Service (GPRS); Overall description of the GPRS radio interface; Stage 2 (3GPP TS 03.64 version 8.6.0 Release 1999). 60 pages.
ETSI TS 125 301 V.3.5.0 (Jun. 2000). "Universal Mobile Telecommunications System ("UMTS"); Radio Interface Protocol Architecture (3G TS 25.301 version 3.5.0 Release 1999)" 46 pages.
ETSI TS 125 322 V.3.3.0 (Jun. 2000). "Universal Mobile Telecommunications System (UMTS); RLC Protocol Specification (3G TS 25.322 version 3.3.0 Release 1999)." 126 pages.
European Telecommunication Standard, ETS 300 556, Feb. 1995. "European digital cellular telecommunications system (Phase 2); Mobile radio interface signalling layer 3; General aspects (GSM 04.07)." European Telecommunications Standards Institute.
Ferracioli. "Channel Based Adaptive Resource Allocation at the MAC Layer in UMTS TD-CDMA Systems." Vehicular Technology Conference, 2000. pp. 2549-2555.
File history of U.S. Appl. No. 09/083,675. 207 pages.
GSM 03.60 v2.0.0, May 1997. "Digital cellular telecommunication system (Phase 2+); General Packet Radio Service (GPRS); Service Description, Stage 2." European Telecommunications Standards Institute.
Hartmann. "Agent-based banking transactions & information retrieval—What about performance issues?" Feb. 2000.
Information Sciences Institute. "Internet Protocol. DARPA Internet Program. Protocol Specification." Sep. 1981, 49 pages.
Interim European Telecommunication Standard, I-ETS 300 022-1, Mar. 1998, Second Edition. "Digital cellular telecommunications system (Phase 1), Mobile radio interface layer 3 specification, Part 1: Generic (GSM 04.08 version 3.14.0)." European Telecommunications Standards Institute.
International Preliminary Examination Report for PCT/US00/29687 dated Dec. 18, 2001.
International Search Report for PCT/US00/20577 dated Jan. 5, 2001, 5 pages.
International Search Report for PCT/US00/29687 dated Mar. 21, 2001, 3 pages.
International Search Report for PCT/US00/29687 dated Mar. 28, 2001.
International Search Report for PCT/US01/43582 dated Aug. 20, 2002, 3 pages.
Jain. "On the Impact of Channel and Channel Quality Estimation on Adaptive Modulation." Dec. 2002, 92 pages.
Karn. "The Qualcomm CDMA Digital Cellular System." Date Unknown.
Kautz et al. "A Distributed Self-Clocked Fair Queuing Architecture for Wireless ATM Networks." IEEE, 1997 (pp. 189-193).
Khun-Jush et al. "HIPERLAN type 2 for broadband wireless communication." Ericsson Review No. 02, 2000.
Lee. "Convolutional Coding, Fundamentals and Applications." Artech House, Inc. 1997, p. 11-51.

* cited by examiner

PACKING SOURCE DATA PACKETS INTO TRANSPORTING PACKETS WITH FRAGMENTATION

RELATED APPLICATIONS

This application is a continuation application of U.S. application Ser. No. 15/160,065 filed May 20, 2016; which is a continuation of U.S. application Ser. No. 14/831,387 filed Aug. 20, 2015, issued as U.S. Pat. No. 9,374,733, issued Jun. 21, 2016; which is a continuation of U.S. application Ser. No. 12/886,323 filed Sep. 20, 2010, issued as U.S. Pat. No. 9,119,095, issued Aug. 25, 2015; which is a continuation of U.S. application Ser. No. 10/053,179 filed Jan. 15, 2002, issued as U.S. Pat. No. 8,009,667, issued Aug. 30, 2011; which claims priority to U.S. Provisional Application No. 60/262,005, filed on Jan. 16, 2001, all of which are incorporated herein by reference in their entirety.

BACKGROUND OF THE INVENTION

Field of the Invention

The present invention relates to packet data communications systems, and reformatting data in such systems before transmitting the data through a link.

Description of the Related Art

Data communications systems typically transfer data from a source to an end user by routing the data in packets through communications links. All links have physical limits on their data-carrying capacity, or bandwidth. It is a constant pursuit to most efficiently utilize the finite capacity of any communications link in an effort to increase data throughput.

Many varieties of communications systems exist with a variety of different protocols governing their transmission of data. The information transmitted in many of these systems is transmitted in discrete packets of data. For each system these packets may be of a standard length or may vary in length as the needs of the users dictate, but the format of the packets are generally unique to the protocol utilized. Data packets utilizing a particular protocol and format may be referred to as service data units, or SDUs. An exemplary format, Internet Protocol or EP format, permits flexibility in the routing of data between a source and a destination, while other formats may convey voice data with limits on time delays, so as to ensure that the voice data can be reconstructed with adequate fidelity at the receiving end. It is often desirable for data in various formats to utilize the same data links as part of their transmission paths. This is particularly true for links directed to solving the problem of connecting end users to the various communications networks that are the source of data sought by those users, known as the "last mile" problem. Solutions for the "last mile" problem tend to attempt to satisfy, to the greatest extent possible, the needs of the users, while supporting the various protocols and packet formats that the data may utilize. While these solutions often involve various processes, it is often true that most communications links utilize a specific data packet format and protocol of their own to most efficiently utilize those links; the protocol data packets utilized by these links may be referred to as Protocol Data Units or PDUs. It is an ongoing effort in the data communications industry to maximize the efficiency of communications links having a finite bandwidth while maintaining the integrity of the protocol and format of the SDUs being transported by those links.

SUMMARY OF THE INVENTION

The systems and methods have several features, no single one of which is solely responsible for its desirable attributes. Without limiting the scope as expressed by the claims which follow, its more prominent features is now discussed briefly. After considering this discussion, and particularly after reading the section entitled "Detailed Description of the Preferred Embodiments" one will understand how the features of the system and methods provide several advantages over traditional communications systems.

In one aspect, the invention relates to a system and method of formatting data arriving in SDUs of various formats into different packets, having a PDU packet format, for transport across a communications link, comprising packing one or a plurality of fragments of arriving SDUs or whole SDUs into single PDU packets.

Within the above aspects, the plurality of SDUs may have different lengths, with a length of at least some of the SDUs reflected in respective packing subheaders. The packing subheaders may be made contiguous with the SDUs whose length within the PDU they reflect, or in another aspect may be separated from the SDUs. Other aspects include the foregoing systems or methods, further providing at least two fragmentation control bits in a header of the PDU. The fragmentation control bits may indicate absence or the presence and orientation of any fragments in the PDU.

Another aspect can be embodied in any packeted data communications network. For example, the aspect may be embodied in a broadband wireless link that connects a plurality of end users to various networks.

In another aspect, a millimeter wavelength wireless RF channel communications system connecting single base stations to a plurality of relatively proximate nodes can be utilized. A network of such base stations with their surrounding nodes can provide communications services over a large area, such as a city. Such a system is representative of a variety of communications links having a limited communications media which must be shared by a plurality of different entities. Such systems may include wire connected information distribution systems such as, for example, Dial-up or DSL systems, visible light spectrum data transmission systems, and microwave data transmission systems among others.

In yet another aspect, a method is disclosed of packing data prior to transferring it through a communications link while utilizing the advantages of fragmentation of SDU packets, and coordinating the two methods to optimize the advantages of each. Incoming SDU data packets that have been formatted according to a first, second or other protocol, such as ATM standard format or Internet Protocol (IP) or any other protocol, are compressed and reformatted and then conveyed over one or more links in accordance with a second PDU protocol, such as, for example, variable length packet MAC protocol. After it has traversed the link, the data may be reconstructed back into the first protocol format so that the data modifications performed by the link will be transparent to the receiving node or user.

DETAILED DESCRIPTION

Embodiments of the invention are now described with reference to the accompanying figures, wherein like numerals refer to like elements throughout. The terminology used in the description presented herein is not intended to be interpreted in any limited or restrictive manner simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Communications networks often need to transport data in a variety of different formats. It is therefore useful if communications systems that provide links within an overall communications network are able to accept data in a first or second format such as ATM or IP, or many other formats such as voice communications, Ti, El, or any other format common in the art. However, it is also useful for many communications system links to have a particular preferred format for all transported data in order to most efficiently utilize the link capabilities. To harmonize these two advantages, it is often desirable that a linking or transporting communications system accepts data in many formats and converts the data into a transporting format for transport across the link. At the far end of the link, the reformatted data may be returned to its original format. In this process of reformatting, incoming data arrives as SDUs (Service Data Units), which may be in any of the above mentioned formats, and will be converted to PDUs (Protocol Data Units) having a format desirable for a linking communications system. It is desirable to fit the SDUs efficiently into the PDUs to enhance the data carrying capability of the communications system link transporting the incoming data SDUs.

An example of a communications system that provides links for use within overall communications networks is described in copending U.S. patent application Ser. No. 09/702,293, entitled "COMPRESSION OF OVERHEAD IN LAYERED DATA COMMUNICATION LINKS," filed Oct. 30, 2000 (the '293 application), which is hereby incorporated by reference. The methods described herein may be employed with the system modules described in the '293 application to form an improved system for transporting data across a communications link. Appropriate functional modules described in the '293 application employing the specific methods of packing described below form a system and apparatus for packing SDUs into transport system PDUs that have the capacity to carry SDU fragments, which are portions of SDUs. Fragmenting is a method of partitioning a packet of data into two or more smaller pieces to be conveyed over a communications link that utilizes packets; and it is accomplished when the packet is too large for the existing bandwidth of a current frame or communications cycle.

Figure 1:
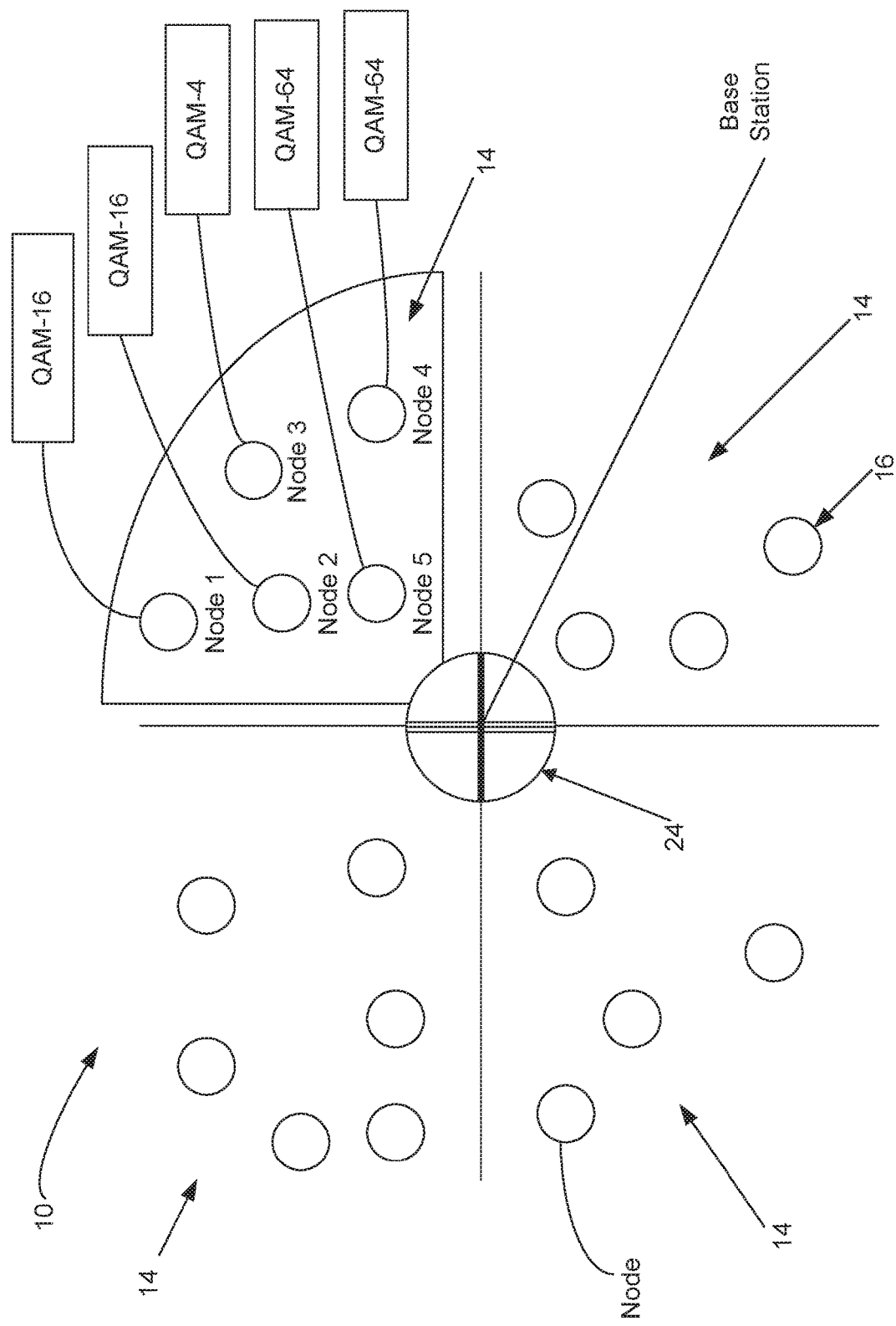
FIG. 1 is a high level illustration representing an overall communications network and system.

FIG. 1 is a high level illustration representing an overall communications network and system. FIG. 1 depicts a representative network for transmitting data packets from a data source to end-users and vice versa. While FIG. 1 depicts a system utilizing a wireless link between a base station 12 and nodes 16, this is only exemplary and any transmission link, such as electrical conductors, RF waves, microwaves, optical fiber conductors, and point to point/multipoint light transmission links, can be used. The communications domain of the base station 12 in FIG. 1 is directional and is broken up into four sectors 14 with each sector 14 capable of containing multiple nodes 16. Although the base station of FIG. 1 provides for four sectors 14, the base station 12 may be non-directional, having no sectors 14, or may have more or less than four sectors 14.

Within each sector 14 or transmission area of the base station 12 there may be any number of nodes 16. The base station 12 may utilize one or more modulation and error correction schemes with which to transmit and receive signals at varying degrees of reliability and bandwidth. The wireless system 10 exemplified in FIG. 1 may utilize Time Division Duplexing (TDD), Frequency Division Duplexing (FDD) or any other duplexing or multiplexing, as well as any other type of communications link modulation or segmenting scheme. For simplicity of explanation, a TDD system will be made reference to hereinafter. As illustrated, some nodes 16 may utilize QAM-4 while others utilize QAM-16 and QAM-64; but the illustrated division between the nodes 16 is only exemplary and the modulation scheme utilized by any particular base station 12 may depend upon the connection establishing and monitoring routine and protocol of the particular system 10.

The highlighted sector 14 contains five nodes 16 with each node 16 serving multiple connections for users. The users may be a service network such as a LAN, WAN, Intranet, Ring Network or other type of network; or they may be a single user such as a work station. The base station 12 is advantageously connected to various data sources such as the internet, other communications networks or any number of data bases, or any other data source. Information is received by the base station 12 from the data source, is prepared for and transmitted across a data link to a node 16, and is then directed to the appropriate connection for transmission to the appropriate user.

Information is advantageously passed in the opposite direction as well, from user to data source.

Within the sectors 14, the downlink transmissions from the base station 12 are typically multiplexed, and each node 16 within a particular sector 14 can receive the same transmission from the base station 12. Each node 16 may await its particular information indicated by some control means and then process only the information contained therein; or alternatively each node 16 may receive all of the data within its modulation group and discard any data not pertinent to the users on its connections. Nonetheless, each node 16 has a distinct "virtual" connection, or communications link, within its sector 14. A link conveys that part of the downlink transmissions within the sector 14 from the base station 12 that contains data for the particular node 16, and also conveys uplink transmissions from the particular node 16 to the base station 12. Nodes 16 in other sectors 14 likewise communicate to base station 12 through links that are virtual connections within the transmissions of their particular sector 14. The transmissions of different sectors 14 are independent of each other. "Sectorized" transmission permits spectrum reuse within a narrow area, thus providing more bandwidth to service particular users.

Figure 2:
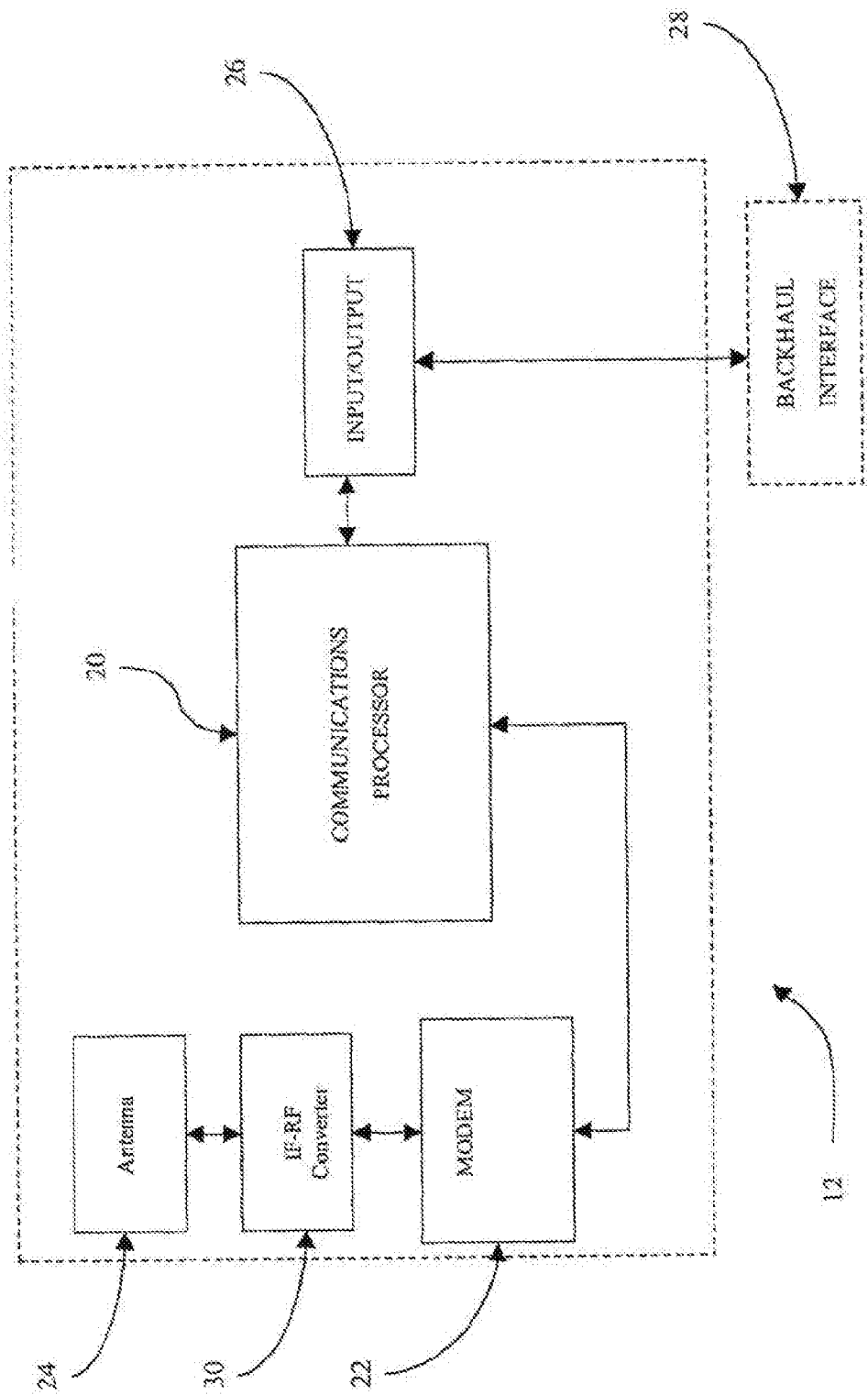
FIG. 2 is a high level functional block diagram of an exemplary base station.

FIG. 2 is a high level functional block diagram of an exemplary base station and illustrates the functional modules that may be used. The term "module," as used herein, means, but is not limited to, a software or hardware component, such as an FPGA or ASIC, which performs certain tasks. A module may advantageously be configured to reside on an addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. Additionally, the components and modules may advantageously be implemented to execute on one or more computers.

A base station 12 may comprise a communications processor 20, a modem 22, an antenna 24, an input/output (I/O) control 26, and an IF/RF converter 30. These modules indicate certain functions but are not intended to indicate any particular architecture. In fact, the functions represented by these modules may be combined into a single module, into multiple modules or any combination thereof, with the illustration in FIG. 2 providing only an exemplary arrangement of one way in which to carry out those functions.

The communications processor 20, or converter, fulfills many functions as described below and provides most of the control functions occurring within the base station 12. During downlink transmissions, the data sources provide data in the form of SDUs to the base station 12 via the backhaul interface 28, which forms the connection between the data sources and the base station 12. The I/O control 26 controls the transfer of SDUs between the base station 12 and the data sources via the backhaul interface 28. The I/O controller 26 transfers the SDUs from the backhaul interface 28 to the communications processor 20, which among many other things, converts them to PDUs of a protocol format that is appropriate for the transmission link. The communications processor 20 transfers the PDUs to a modem 22, which converts them to an intermediate transmission modulation or frequency for an RF link system, and passes them on to an IF-RF converter 30. The IF-RF converter 30 converts intermediate frequency signals provided by the modem 22 to an appropriate frequency required for transmission before passing them to the antenna 24. In a system that does not utilize an RF link, this step may not be necessary, or may take another form that is appropriate for that medium. The antenna 24 preferably receives signals from the IF-RF converter 30 at a radio frequency, or transmission frequency, and transmits them. For systems that do not utilize an RF link, other suitable transmission mechanisms are utilized. In other words, the function provided by the IF-RF converter 30 and antenna 24 may generally be thought of as that of a transmitter in any system, wireless or not.

During uplink transmissions, the antenna 24 receives RF signals from one or more nodes 16 and transfers them to the IF-RF converter 30. The IF-RF converter 30 converts signals provided by the antenna 24 to an appropriate frequency range for the modem 22 to process. The general function performed by the antenna 24 and the IF-RF converter 30 may be thought of as that of a receiver in this or other systems. For nonRF systems, comparable modules would perform these functions to prepare the received signals for the modem 22. The modem 22 demodulates the signal from the IF-RF converter 30 and transfers a digital signal comprised of PDUs to the communications processor 20. The communications processor 20 receives the digital signal from the modem 22 and, among other things, converts the signal into the SDUs that the users had transmitted to the node 16. The SDUs are then sent to the I/O control 26 for transfer out of the base station 12. The I/O control 26 transmits the SDUs to the appropriate data source via the backhaul interface 28.

Figure 3:
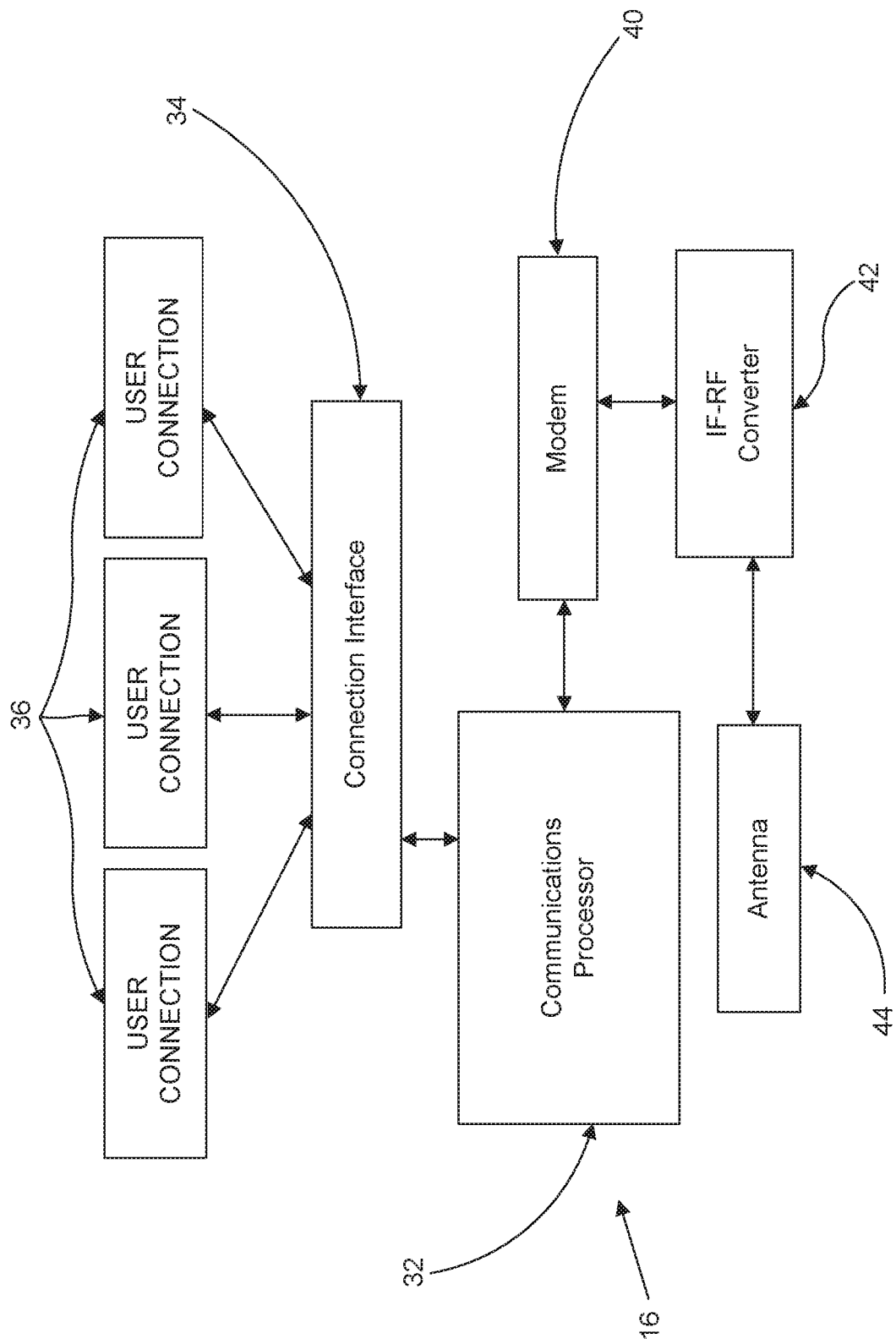
FIG. 3 is a high level functional block diagram of an exemplary node.

FIG. 3 is a high-level block diagram of the functional modules of an exemplary node. A node 16 may include a communications processor 32, a modem 40, an IF-RF converter 42, an antenna 44, and a connection interface 34 coupled to a plurality of user connections 36. These modules indicate certain functions, but are not intended to indicate any particular architecture. The functions may be fulfilled by any particular module alone or in any combination. Alternatively, a single module may accomplish all of the functions.

During downlink transmissions, the PDUs are transmitted from the base station 12 to the node 16 and are received at the node 16 by the antenna 44, for RF systems. Systems not using RF communications links would use a receiver having analogous receiving components. The antenna 44 converts the RF signals received into electronic signals which are then transferred to the IF-RF converter 42. The IF-RF converter 42 converts the signals from the transmission frequency to an intermediate frequency and transfers those signals to the modem 40. The modem 40 further demodulates the intermediate frequency signals into a digital signal that includes PDUs. The digital signal including PDUs that are then transferred to the communications processor 32, or converter, which then converts the PDUs back into the SDUs that were sent to the base station 12 by the data source(s). The SDUs are then directed to the connection interface 34, which directs the SDUs to the appropriate user connection 36. The SDUs can then be directed to the appropriate users via the user connections 36.

During uplink transmissions, information packages in the form of SDUs are provided by the user connections 36 to the connection interface 34. The connection interface 34 is utilized by the communications processor 32 to control the transmission of SDUs to the node 16 and transfers the SDUs to the communications processor 32. The communications processor 32, among other things, converts the SDUs into the appropriate PDU format for the transmission link. The PDUs are then transferred from the communications processor 32 to the modem 40, which modulates them onto an IF carrier signal. The modem 40 transfers the IF signal to an IF-RF converter 42, which further converts the signal to the RF range that is appropriate for the antenna 44 or other transmitting mechanism. Again, if an RF communications link is not being utilized, the IF-RF converter 42 and the antenna 44 may be substituted by an appropriate transmitter function module. This function is that of a transmitter and any suitable transmitter may be used. The RF signal is then transmitted via the antenna 44 across the comminations link to the base station 12 for processing and transference to an appropriate data source as discussed above.

Figure 4:
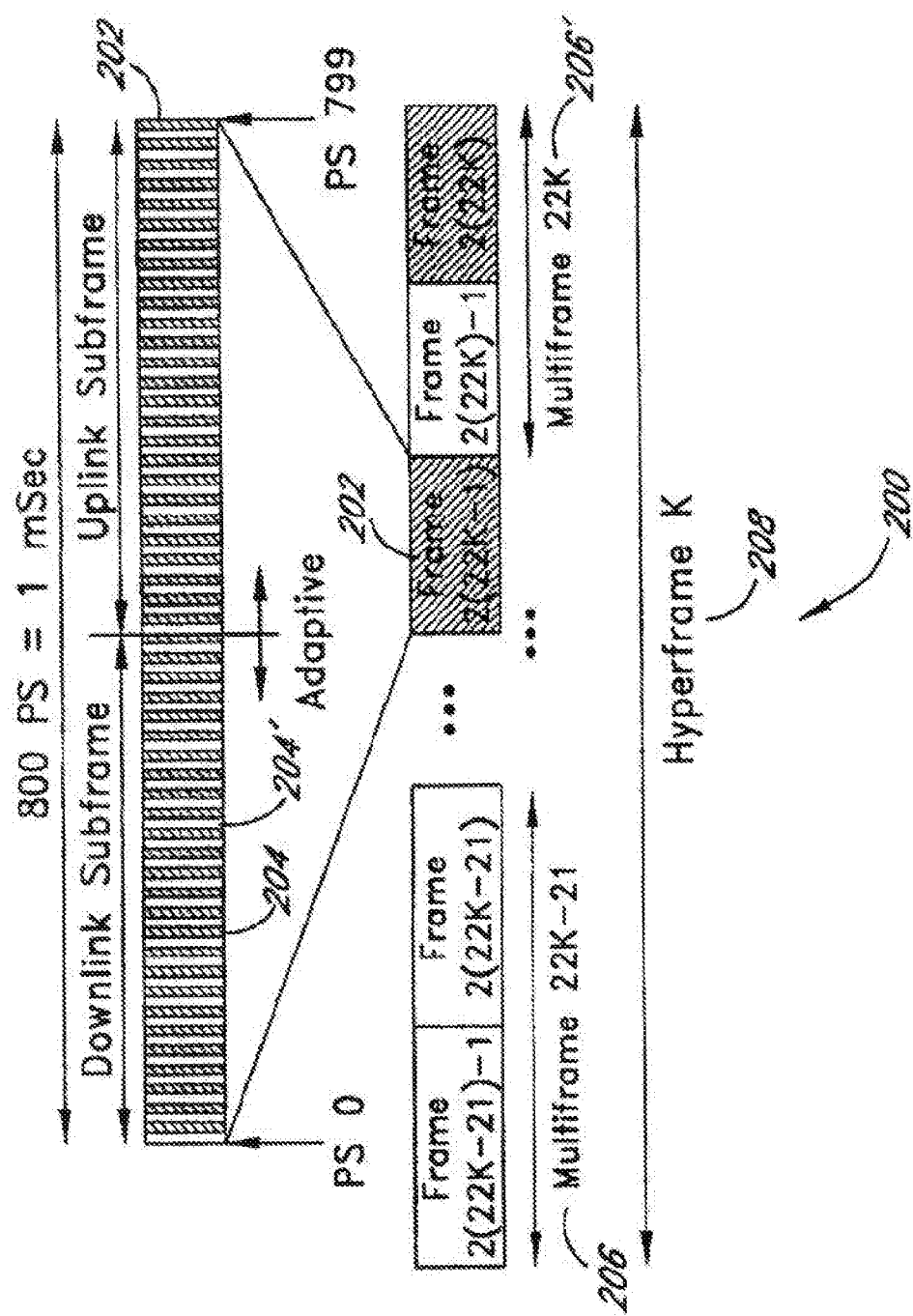
FIG. 4 is an illustration of the breakdown of a frame in communications systems utilizing frames.

FIG. 4 is an illustration of the breakdown of a frame in communications systems utilizing frames. FIG. 4 shows a TDD frame and multi-frame structure 200 that may be used by the communications system 10 of FIG. 1. As shown in FIG. 4, the TDD frame 200 is subdivided into a plurality of physical slots (PS) 204, 204'. In one embodiment, the TDD frame 200 is one millisecond in duration and includes 800 physical slots. Alternatively, the present invention can be used with frames having longer or shorter duration and with more or less PSs. Some form of digital encoding, such as the well-known Reed-Solomon (RS) encoding, convolutional encoding, or turbo code encoding, may be performed on the digital information over a pre-defined number of bit units referred to as physical layer information elements (PI). The modulation and/or the FEC type may vary within the frame and determines the number of PSs (and therefore the amount of time) required to transmit a selected PI. In one embodiment, data is referred to as being sent and received using three different modulation types, namely, QAM-4, QAM-16, and QAM-64.

In alternative embodiments, other modulation types, FEC types, or variation of a modulation or FEC type may be used. For example, an RS encoding system may use different variations of block sizes or code shortening; a convolutional encoding system may vary the code rate; and a turbo code system may use any block size, code rate, or code shortening. To aid periodic functions, multiple frames may be grouped into multiframes 206, and multiple multi-frames 206 may be grouped into hyper-frames 208. In one embodiment, an Adaptive Time Division Duplex (ATDD) system may be implemented. In ATDD mode, the percentage of the TDD frame allocated to downlink versus uplink is a system parameter that may change with time. In other words, an ATDD system may vary the ratio of downlink data to uplink data in sequential time frames.

Figure 5:
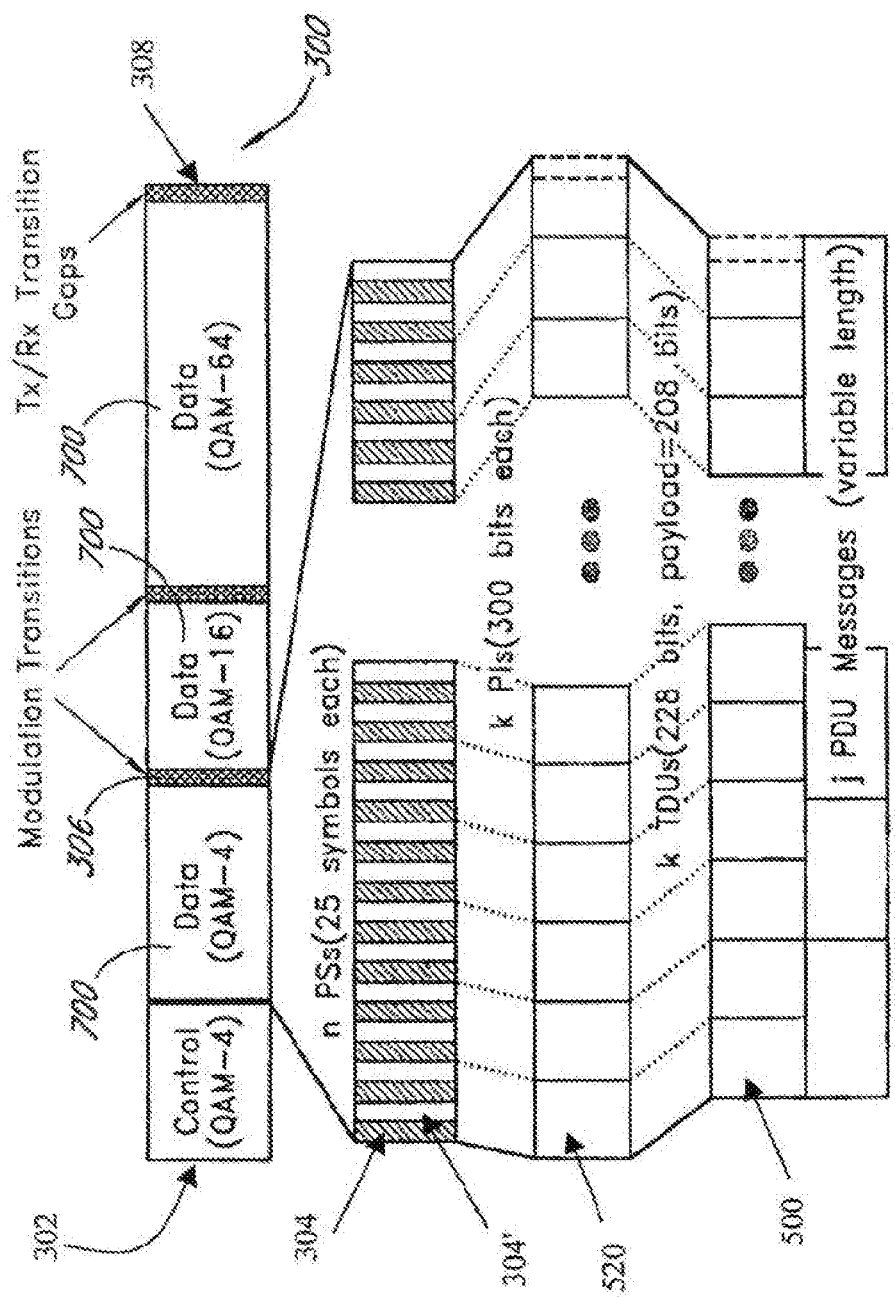
FIG. 5 is an illustration of the Downlink mapping of messages from PHY elements to PDUs in one embodiment.

FIG. 5 is an illustration of the downlink mapping of messages from PHY elements to PDUs in one embodiment. FIG. 5 shows one example of a TDD downlink subframe 300 that can be used by the base station 12 to transmit information to the plurality of nodes 16. The downlink mapping illustrated in FIG. 5 can be performed by the communications processor in the base station, and is performed to map PDUs of varying lengths to the PSs utilized by a wireless communications system as described above with reference to FIG. 4. As mentioned previously, in a TDD system, each time frame is divided into a downlink subframe and an uplink subframe. More specifically, during each frame (or other predetermined period), the downlink subframe is first transmitted from the base station 12 to all nodes 16 in the sector 14, after which the uplink subframe is received by the base station 12 from particular nodes 16. The downlink subframe 300 may be dynamic, such that it may be different in sequential time frames depending on, among other things, an uplink/downlink split determined by the communications processor 20. In an FDD system, the time frame is not divided between uplink and downlink data. Instead, an FDD downlink subframe is an entire frame of downlink data on a first channel, and an uplink subframe is an entire frame of uplink data on a second channel. In a typical FDD system, the downlink subframe and uplink subframe may be transmitted simultaneously during the same predetermined period. Thus, in an FDD system both the base station 12 and the nodes 16 may receive and transmit at the same time, using different channels. In another embodiment, the downlink subframe and uplink subframe may not be transmitted at the same time, but still use different channels.

The downlink subframe 300 of FIG. 5 preferably comprises a frame control header 302 and a plurality of downlink data PSs 204. The plurality of data PSs may be grouped by any combination of modulation type, FEC type, node index, and connection ID and may also be separated by associated modulation transitions (MTs) 306. MTs separate differently modulated data, and a transmit/receive (Tx/Rx) transition gap 308. MTs may be a gap, a period of time to allow for the transition from one modulation group to the next. Alternatively, that transition can occur at the boundary between the last PS of one modulation group and the first PS of the next modulation group. In any downlink subframe, any one or more of the differently modulated data blocks may be absent. In one embodiment, MTs 306 are 0 ("zero") PSs in duration. The frame control header 302 may contain a preamble that can be used by the physical protocol layer (PHY) for synchronization and equalization purposes. The frame control header 302 also includes control sections for both the PHY and the PDU protocol controls. An FDD downlink subframe may be substantially identical to the structure of FIG. 5, but without a Tx/Rx transition gap 308.

The downlink data PSs 304, 304' are advantageously used for transmitting data and control messages to the nodes 16. This data is preferably encoded (using a ReedSolomon encoding scheme, or other scheme for example) and transmitted at the current operating modulation used by the selected node 16. In one embodiment, data is transmitted in a pre-defined modulation sequence, such as QAM-4, followed by QAM16, followed by QAM-64. The MTs 306, if present, are used to separate the modulation schemes to synchronize the base station 12 and the nodes 16. The PHY control portion of the frame control header 302 preferably contains a broadcast message to all of the nodes indicating the identity of the PS 304 at which the modulation scheme changes. The ordering of modulation groups in the transmission subframe illustrated in FIG. 5 is only an example and any ordering of modulation groups may be used; alternatively, the order may change from frame to frame depending on the needs of the system. Finally, as shown in FIG. 5, the Tx/Rx transition gap 308 separates the downlink subframe from the uplink subframe. While the present embodiment illustrates the use of a gap to transition from uplink to downlink, systems may be equipped so as to identify the transition without the use of gaps.

FIG. 5 also shows an embodiment of a three-stage mapping process from a stream of variable length PDUs or user messages, to 228-bit TC Data Units (TDUs) 500, otherwise known as a TC/PHY packets 500, to 300-bit PIs and finally to 25-symbol PSs (PIs and PSs are described above with reference to FIG. 4). The illustration and description of the process for conversion of SDUs into PDUs is discussed in detail later.

In one embodiment, a minimum physical unit that the system allocates is the 25-symbol PS 304, 304'. The minimum logical unit the exemplary system of FIG. 5 allocates may be a 208-bit (26-byte) payload of the 228-bit TC Data Unit (TDU) 500. Other embodiments can be used that have different minimum quantities of the physical and logical units without departing from the scope of the present invention.

Alternatively, information mapping processes may take different steps between PDU formation and transmission. For instance, the last TDU (and PI) of a particular modulation may be shortened if there is not enough data to fill the entire TDU. This variability of the length of the last TDU and PI are illustrated by the dashed lines in the last TDU and PI in FIG. 5; and the length of the last TDU and PI may be any length shorter than, or including, their respective full ordinary lengths.

The 228-bit TDU 500 may be encoded using the well-known Reed-Solomon coding technique to create the 300-bit PIs 520. Bandwidth needs that do not require encoding, such as the various transition gaps, are preferably allocated in units of 1 PS. Bandwidth needs that require encoding (using a Reed-Solomon encoding scheme, for example) may be allocated in TDUs 500. Also, data for each modulation scheme, on the downlink, and each node's transmission, on the uplink, are advantageously packed and fragmented to form an integer multiple of TDUs 500 to create an integer multiple of PIs 520 or, alternatively, may be packed and fragmented into an additional fractional and shortened TDU to create a fractional and shortened PI. The number of PSs 304, 304' required to transmit a PI 520 may vary with the modulation scheme used. An exemplary system for mapping PDUs to the PHY, and vice versa, is described in detail in commonly assigned Patent Cooperation Treaty Application Number PCTUS00/29687, entitled METHOD AND APPARATUS FOR DATA TRANSPORTATION AND SYNCHRONIZATION BETWEEN MAC AND PHYSICAL LAYERS IN A WIRELESS COMMUNICATION SYSTEM (the '687 application"), which is hereby incorporated by reference. The mapping from PDU to PHY in the '687 application discloses a means of converting PDUs to a form appropriate for transmission by a wireless link. Similar systems can be used for embodiments utilizing different communications links.

Figure 6:
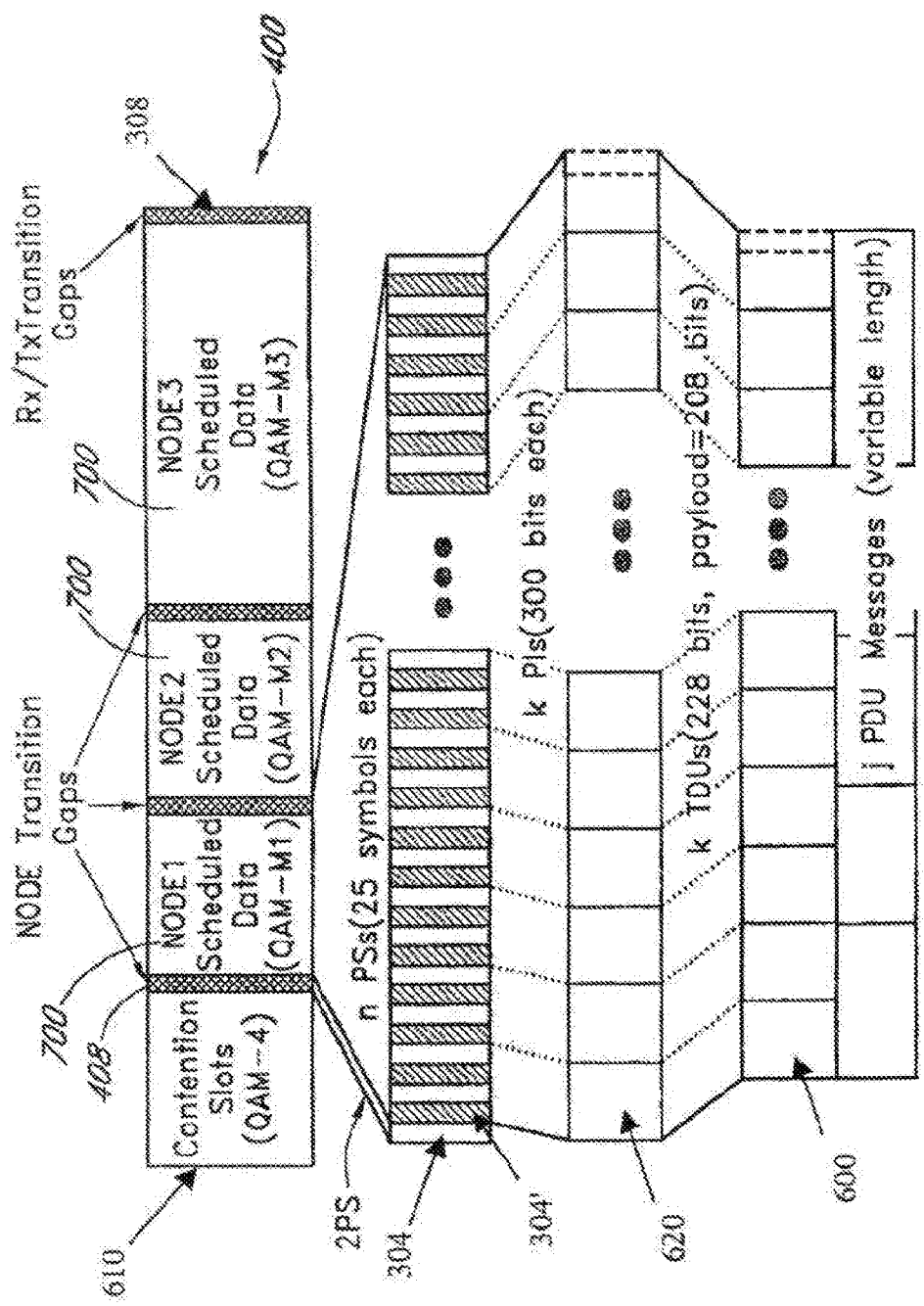
FIG. 6 is an illustration of the Uplink mapping of messages from PDUs to PHY elements in one embodiment.

FIG. 6 is an illustration of the uplink mapping of messages from PDUs to PHY elements in one embodiment. The uplink of data from upper layers to the PHY layer may occur in the communications processors of the various nodes served by each base station. FIG. 6 shows an example of an uplink subframe 400 that may be adapted for use with the data transportation and synchronization process. The nodes 16 use the uplink subframe 400 to transmit information (including, for example, bandwidth requests) to their associated base stations. There may be three or more main classes of control messages that are transmitted by the nodes during the uplink subframe 400. Examples include: (1) those that are transmitted in contention slots reserved for node registration (Registration Contention Slots); (2) those that are transmitted in contention slots reserved for responses to multicast and broadcast polls for bandwidth allocation (Bandwidth Request Contention Slots); and (3) those that are transmitted in bandwidth specifically allocated to individual nodes (node Scheduled Data Slots).

During its scheduled transmission time, a node typically transmits in a selected modulation that can be selected based upon, for example, the effects of environmental factors on transmission between that node and its associated base station. The uplink subframe 400 includes a plurality of node transition gaps (NTGs) 408 that serve a function similar to that of the MTs described above. That is, the NTGs 408 allow for the transition from one node to the next during the uplink subframe 400. In one embodiment, the NTGs 408 are 2 physical slots in duration. A transmitting node 16 may transmit a 1 PS preamble during the second PS of the NTG 408 thereby allowing the base station to synchronize to the transmission of the new node. In other embodiments, node transitions may alternatively occur at the transition between the last PS of one node's uplink transmission and the first PS of the next node's uplink transmission. One embodiment utilizes a system similar to that described in the '687 application for transmitting data from nodes to a base station; and this system and method should be understood to advantageously utilize such a system.

As illustrated in FIG. 6, an uplink subframe 400 may comprise uplink contention access slots 610 as well as data slots 700. The uplink contention access slots 610 may include registration contention slots (not shown) and bandwidth request contention slots (not shown). The uplink subframe 400 may begin with optional registration contention slots, or alternatively, the registration contention slots may be located at other points of the uplink subframe such as in the middle or at the end. Some registration contention slots are allocated periodically to the physical slots for use during node registration. In one embodiment, registration messages are preceded by a 1 PS preamble and are sent alone. Also, other PDU control messages are not packed into the same PDU. The bandwidth request contention slots may be allocated for responses to multicast and broadcast polls for bandwidth requirements. In one embodiment, the bandwidth request messages, when transmitted in the bandwidth request contention period, may be proceeded by a 1 PS preamble. Nodes may pack additional bandwidth requests for other connections into the same PDU.

FIG. 6 also shows the mapping of the scheduled portion of the uplink subframe 400. Within the subframe 400, the TC/PHY packets 700 can be grouped by nodes. All transmissions from an individual node 16, other than bandwidth requests transmitted in bandwidth request contention slots, may be transmitted using the same modulation scheme. In one embodiment, each node's transmission is packed and fragmented to be an integer multiple of a TDUs 600 to provide an integer multiple of PIs 620 after coding. In an alternative embodiment, if the bandwidth requested for pending uplink data does not require the entire last TDU, the bandwidth may be allocated such that the last TDU is shortened, resulting in a shortened PI. Again, this variability of the length of the last TDU and PI are illustrated by the dashed lines in the last TDU and PI in FIG. 6; and the length of the last TDU and PI may be any length shorter than, or including, their respective full ordinary lengths. The uplink and downlink mapping provides a mechanism for the higher communications protocol layers to transport data to the PHY layer.

By using such a data transportation and synchronization technique, scheduled uplink and downlink data is transported and synchronized between the PDU processing layer (discussed below as item 935 in FIG. 9) and the physical layer. The scheduled uplink and downlink data are preferably transported within the uplink subframe 400 and the downlink subframe 300, respectively, based upon the modulation scheme used by the nodes 16. Uplink mapping of PDUs to PHY elements may be performed according to the three stage process of PDU to TDU 600, then from TDU 600 to PI 620, then from PI 620 to PS. However, it is to be understood that there are numerous processes that are analogous and similar that may have more or less steps and may be used. Again, the process of converting SDUs to PDUs is described in detail later and the mapping described here provides understanding of how PDUs may be allocated to PIs in one wireless embodiment.

Figure 7:
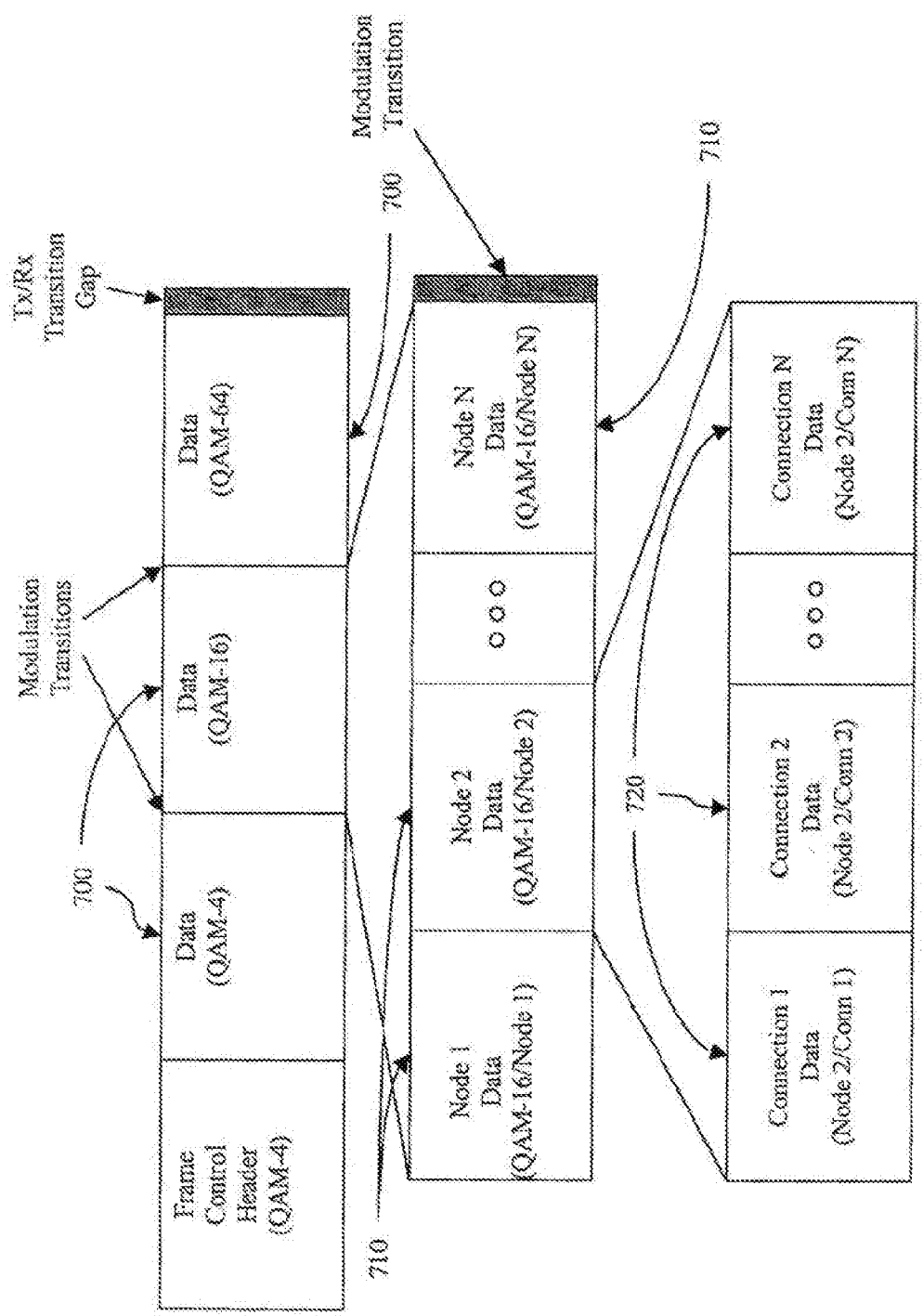
FIG. 7 is an illustration of an information hierarchy from sector transmission to modulation group information to connection breakdown in an exemplary transmission link frame.

FIG. 7 is an illustration of an information hierarchy from sector transmission to modulation group information to connection breakdown in an exemplary transmission link frame. FIG. 7 illustrates the way information might be organized in messages sent from the base station to the nodes. As mentioned above, the base station transmits messages to the nodes containing three main categories of information; 1) a frame control header 302, containing information to the nodes concerning the handling of the data, 2) the data 700 being conveyed from the data sources to the end users, and 3) the gaps 306, 308 that separate the different sections of the transmission. The data can be broken down into the different modulation groups such as the system illustrated by FIG. 7 wherein those are the QAM-4, QAM-16, and QAM-64 modulation groups. A system may have more or less modulation groups. Again, the ordering of the modulation groups illustrated in FIG. 7 is only exemplary and any ordering or a shifting order may be utilized. FIG. 7 also illustrates a Tx/Rx transition gap, or a period of time for transition from the downlink subframe to the uplink subframe. It should be noted however that the transition from downlink to uplink may alternatively occur at the boundary between the last PS of the downlink subframe and the first PS of the uplink subframe.

For each modulation group, the data 700 contains information for each node, the node data 710. As mentioned above, those nodes 16 may either download all the information or just their assigned information. The illustration of FIG. 7, depicting the information for each node ordered in a similar manner as the modulation group, is merely exemplary as well. The information for a particular node may also be spread throughout a modulation group downlink, or it may only be discretely located in one portion, or it may be discretely located in several portions. The information intended for each node 16 contains information to be distributed to the end users or services served by the connections of that node; this is identified in FIG. 7 as connection data 720. The connection data 720 includes the information to be transmitted to the users or services as well as control information the node uses to identify to which of its connections each packet of information should be directed. Thus, the node can ensure that each of the packets of information that it receives is directed to the appropriate connection to reach the intended end user or service. In this manner, information transmitted by the base station 12 may logically be divided into modulation data groups 700, and further into node data 710, and further yet into connection data 720. It should be noted that all of the modulation data groups 700, node data 710 groups and connection data groups can be variable in size and may vary from frame to frame as well.

Figure 8:
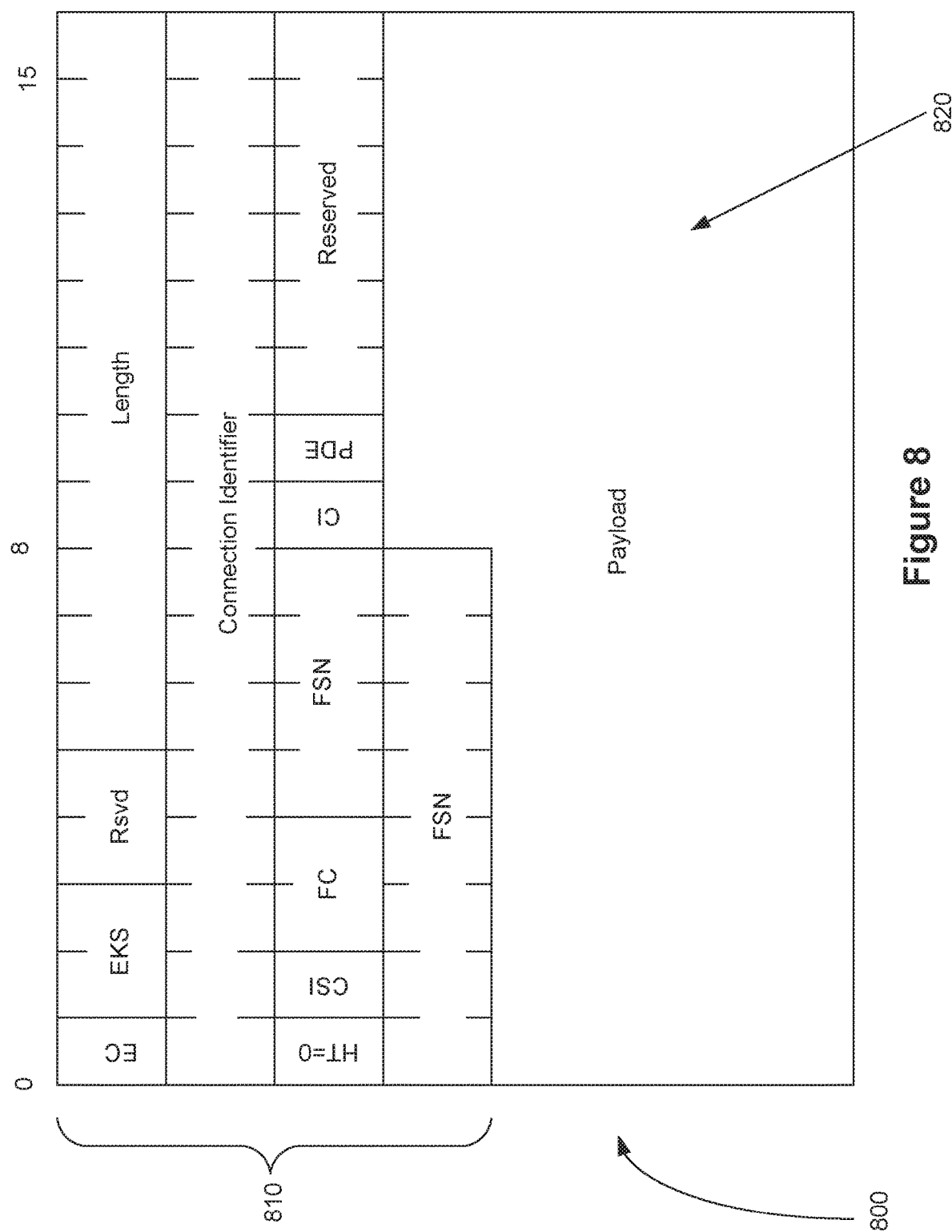
FIG. 8 is an illustration representing a sample PDU header and illustrating the various fields the PDU header might have.

FIG. 8 is an illustration representing an exemplary PDU and illustrating the various fields the PDU header might have. FIG. 8 shows the format of one downlink PDU 800. Although specific fields, field lengths, and field configurations are described with reference to FIG. 8, those skilled in the communications art shall recognize that alternative configurations may be used including additional or fewer fields. In several embodiments, the communications processors of both the base station and the nodes create PDU payloads and PDU headers to be transmitted and retrieve SDUs from received PDUs. An exemplary downlink PDU format 800 may include a standard downlink PDU header 810 and a variable length PDU payload 820. The downlink PDU header 810 of one embodiment comprises 13 different fields that measure 7 bytes in total length. The downlink PDU header 810 illustrated in FIG. 8 begins with an encryption control (EC) field. In certain embodiments, the EC field is set to a logical zero if the payload is encrypted; and it is set to a logical one if the payload is not encrypted. The EC field is followed by an encryption key sequence (EKS) field that provides information about the encryption used, if encryption is utilized. A reserved field (Rsvd) may follow the EKS field. The Rsvd field provides for future expansion of the PDU header fields. The Rsvd field is followed by a length field (Length). The Length field indicates the length of the PDU header and any data may contained in the PDU payload. The Connection Identifier field follows the Length field and provides identification information to the base station and the nodes. The Connection Identifier field identifies the destination to which each PDU is to be delivered.

A header type field (HT) follows the Connection Identifier field and indicates whether the header is a standard header or a bandwidth request header. The HT field is followed by a convergence sub-layer identification field (CSI) that provides information so that the communications processor may determine for which sub-layer, among equivalent convergence sub-layer peers, the PDU is intended. The CSI field is followed by a fragmentation control field (FC) and a fragmentation sequence number field (FSN). These two fields allow the communications processor to fragment SDUs to most efficiently utilize the payload of the PDU. The FC and FSN fields indicate the presence and orientation in the payload of any fragments of SDUs. The type of fragments present in the payload and the orientation of those fragments in the payload may vary. For example, fragmentation may result in a fragment that is the first fragment of an SDU, a continuing fragment of an SDU or the last fragment of an SDU.

In one embodiment, a particular SDU may be large enough to require several PDUs to transport it across the communications link. This SDU may require a first PDU to convey the first fragment of the SDU, several other PDUs to convey continuing fragments, and a final PDU to convey the last fragment of the SDU. In this embodiment the FC and FSN bits would indicate that the last part of the payload of the first PDU is a fragment. The FC and FSN bits of the middle PDUs would indicate that they contain continuing fragments in their payload and the last PDU would have FC and FSN bits to indicate that it contains the last fragment of a continuing SDU. The FC and FSN bits would also indicate where each of the fragments is in their respective PDU payload. For instance, the first fragment may be located at the end of the first PDU's payload, while the continuing fragments may take up the whole payload of their associated PDU and the last fragment may be at the beginning of the last PDU payload. It should be noted however, that more FC or FSN bits may be utilized to indicate any combination of types of fragments present in a PDU and their locations with respect to any whole SDUs in the payload and that the FC and FSN bits do not have to be located in the header but may be located elsewhere.

A CRC indicator field (CI) follows the FC and FSN fields to indicate whether or not CRC is appended to the payload. A packet discard eligibility field (PDE) can also be used and may provide information regarding the payload in a situation where there is congestion. In a congestion situation the wireless communications system may first discard packets indicating discard eligibility. A reserved field follows the PDE field. The reserved field may provide means for future expansion of system functions. In some embodiments packing subheaders may be used to store some header information in the payload as well; and any of the header information may be stored in the packing subheaders. In embodiments utilizing packing subheaders, one of the reserved bits would be utilized to indicate the whether or not packing subheaders are present. Such a bit might be called a packing subheader present field (PSP). Packing subheaders can be of various lengths and describe the length of the individual SDU or fragment payloads that follow each packing subheader. Alternative downlink PDU formats may be similar to the downlink PDU format 800 illustrated in FIG. 8 with minor deviations for differing characteristics.

Figure 9:
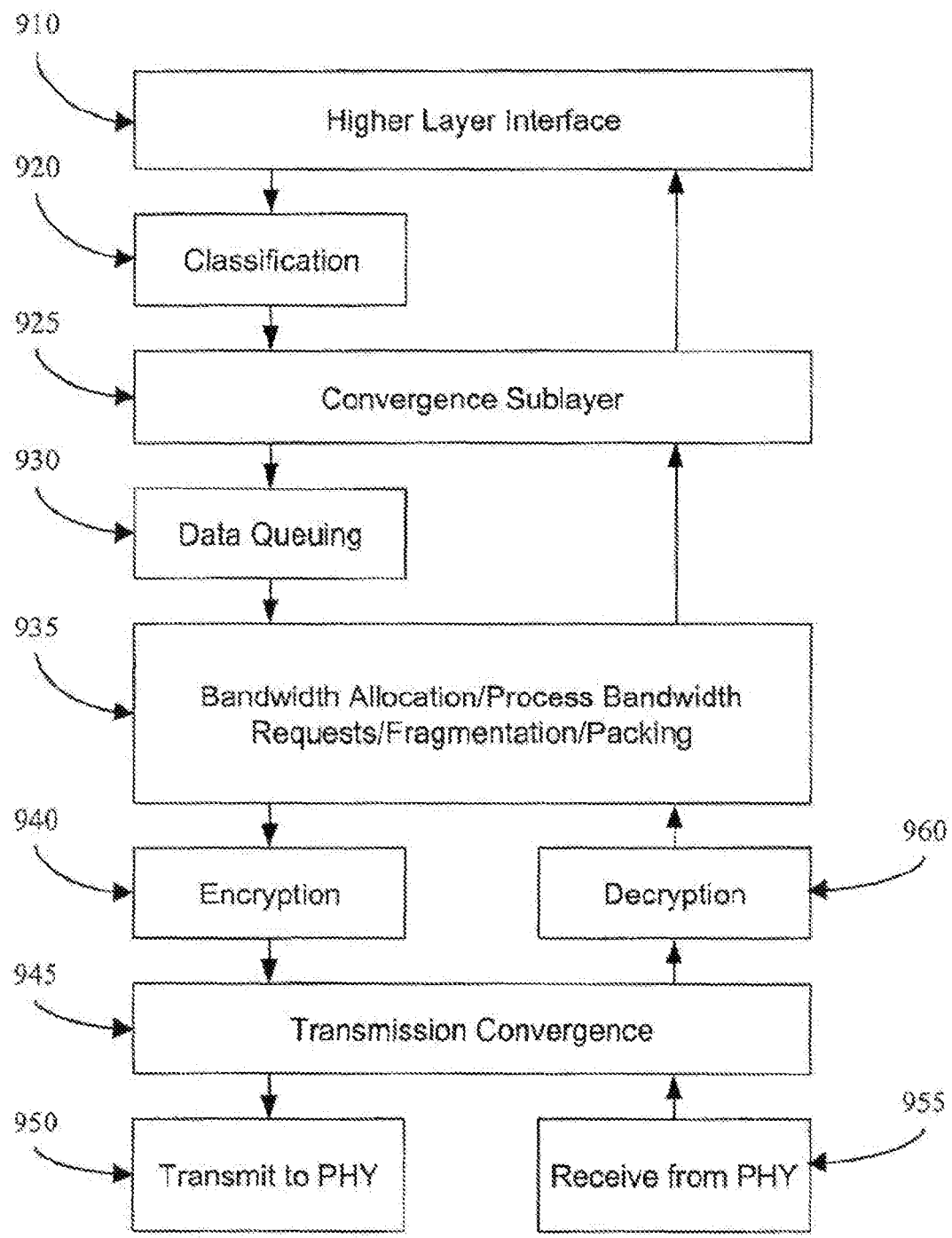
FIG. 9 is a functional block diagram of components that process and transfer data in an exemplary base station communications processor.

FIG. 9 is a functional block diagram of components in an exemplary base station communications processor that process and transfer data. FIG. 9 is a high level diagram of those functional components that process and handle data packets being transferred from data source to user and vice versa. These functional components may be located in the communications processor of both the base station and the nodes. The higher layer interface 910 receives the SDUs that come to the base station from the various data sources via the backhaul interface and the input/output control.

Alternatively, the higher layer interface 910 is part of the input/output control. The higher layer interface 910 passes the SDUs to a classification module 920 that determines the connection (or destination), type and size of the SDU. This determination is accomplished using control protocols that are unique to each particular higher layer protocol being transported. The classification data is forwarded to other base station communications processor modules to facilitate other functions such as queuing, packing, fragmentation and assigning proper PDU header characteristics. The SDUs are then forwarded to the convergence sublayer 925 for convergence subprocessing. The convergence subprocesses and their service access points provide the interfaces to higher communications protocol layers for service specific connection establishment, maintenance and data transfer. Convergence subprocesses of data are well-known in the art. One such convergence subprocess is described in a text entitled "Asynchronous Transfer Mode (ATM), Technical Overview", second edition, Harry J. R. Dutton and Peter Lenhard, published by Prentice Hall, October 1995, at pp. 3-21 through 3-24.

Upon processing by the convergence sublayer 925, the SDUs are ready for further processing. The SDUs are distinguished by their type of message format and their connection identification information, among other things as provided by the classification module. In the data queuing module 930 and the bandwidth allocation/process bandwidth request/fragmenting/packing (BPFP) module 935 the SDUs are stored and sorted based upon their individual characteristics and various system protocols. This information may pertain to the type of user connection being served, the node the SDU is to be sent to, the type of SDU, the length of the SDU, the available physical slots in a relevant PDU, as well as many other factors. In one embodiment, the base station maps and allocates bandwidth for both the uplink and downlink communications subframes. These maps can be developed and maintained by the base station communications control modules (conveyed in FIG. 10) in conjunction with the BPFP module 935 and may be referred to as the Uplink Subframe Maps and Downlink Subframe Maps. The communications processor must allocate sufficient bandwidth to accommodate the bandwidth requirements imposed by high priority constant bit rate (CBR) services such as Tl, El and similar constant bit rate services and their respective formats. In addition, the communications processor must allocate the remaining system bandwidth to mid-priority services and also to the lower priority services such as Internet Protocol (IP) data services and their respective formats. In one embodiment, the communications processor distributes bandwidth among these lower priority services using various QoS dependent techniques such as fair-weighted queuing and round-robin queuing, among others.

The BPFP module 935 also utilizes the data queuing module 930 to pack the SDUs into PDUs. While the SDUs are being packed into PDUs, it may be necessary to fragment an SDU if the remaining space in the relevant PDU cannot store the whole SDU. In one embodiment, fragmentation and packing occur cooperatively so as to maximize the benefit of each. For packing and fragmentation to occur in a cooperative manner, both processes should occur nearly contemporaneous to one another and in accordance with one another. If packing and fragmentation are done independently of one another, not only may the advantages of both processes be lost, the resulting system may actually be less efficient than if only one of the two processes occurred. In one embodiment the packing and fragmenting processes occur independently of the bandwidth allocation process and simply pack and fragment the SDUs as they are queued up by a separate queuing process. In another embodiment the packing and fragmentation occur in conjunction with bandwidth allocation processes and algorithms to most efficiently utilize the communications link at any one time. Numerous queuing techniques and QoS systems may be implemented, but certain embodiments should be flexible and allow the system controls to be adjusted as bandwidth demands change, as connection topography changes and as system demands change based on user requests and feedback. The variety of system configurations available and the ability to change as needed make such embodiments highly useful and largely advantageous over existing systems.

Messages now in PDU format may then be encrypted for their secure transmission. A module, such as encryption module 940, is advantageously provided for this function. As discussed above with respect to FIG. 5, PDU packets may then undergo a transmission convergence (TC) process to map the PDU packets into TC/PHY packets, or TDUs as previously illustrated in FIGS. 5 and 6. This process may occur in one or multiple modules such as transmission convergence module 945. In past systems, fragmentation may have occurred in the TC process, however, such processing at this stage would be independent of the packing and bandwidth allocation processes and could therefore result in a sharp decrease in the potential benefits provided by each of those processes. The TC process may be an intermediate format as well as a couple between the PDU formation and mapping to PHY elements (PIs as also mentioned above with respect to FIGS. 5 and 6) in the physical (PHY) layer. Beyond the TC process, the information may then be transferred to the physical layer for further processing by the modem and the antenna, if such a transmission mechanism is utilized. This mapping of PDUs to PSs may occur in the transmit to PHY module 950 or any functional equivalent.

On the uplink processing of information, data is received from the transmission mechanism and processed by the modem. The PHY reception module 955 in the communications processor then receives the data in the PHY layer. The data undergoes an uplink transmission convergence, as described above with respect to FIG. 6, which converts the TDU format to the encrypted PDU format. The data may then be decrypted in a decryption module 960 and passed to the BPFP module 935 for transformation from PDU packet format back to the various SDU packet formats that were originally received by the nodes from the users. The packets then undergo the convergence process in a convergence sublayer 925 in preparation for transport to the input/output control and on to the appropriate data source via the backhaul interface. By use of these exemplary data handling functional modules, data is efficiently transferred from user to data source and vice versa.

Figure 10:
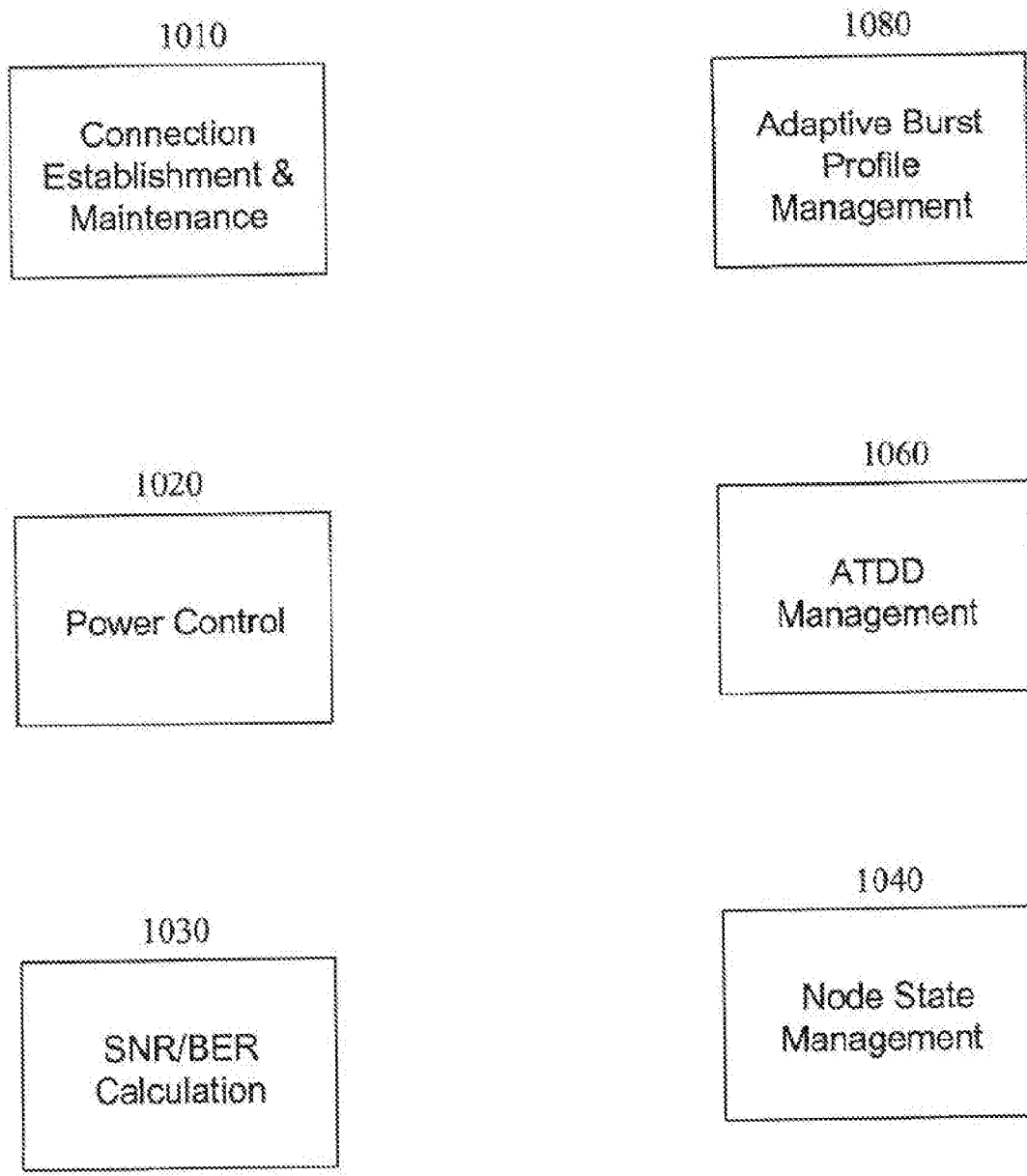
FIG. 10 is functional block diagram of components that handle control functions in an exemplary base station communications processor.

FIG. 10 is functional block diagram of components that handle control functions in an exemplary base station communications processor. The base station communications controls for an ATDD embodiment are illustrated in FIG. 10 and contain information and process control functions for each of the nodes, all of the individual communications links, and all of the system functions in order to effectively monitor, operate and optimize the communications system performance. The functional modules illustrated comprise only a high level description of exemplary control functions and there are many other functions that may occur in the control of a communications system that, for brevity, are not described herein. However, one skilled in the art will appreciate that such functions can be used in such a system.

Communications link connection setup information, maintenance information and performance information can be collected and processed during system operation, and this is advantageously performed by connection establishment and maintenance module 1010. In one embodiment, the number of communications links, should change infrequently as the number of nodes operating in any one sector may rarely change, while the number of connections to those particular nodes may change more rapidly. However, some embodiments may be ideally suited for those systems whose number of links rapidly change and also for those systems that rarely add or drop nodes. The power of the transmitting signal between the base station and the node can be controlled as well to maximize both signal effectiveness and efficiency. A power control module 1020 determines the most appropriate power level at which each node should transmit communications signals on the uplink. The SNR/BER calculation module 1030 can constantly measure the quality of the signal being transmitted between the base station and the nodes to determine if acceptable signal quality levels are being maintained. If not, any number of control parameters may be changed to correct the problem. The type of forward error correction, modulation, or power level utilized for the transmission of the information, among numerous other parameters, may be changed to correct any signal deficiencies.

An adaptive burst profile management module 1080 and an ATDD management module 1060 are used to control the ratio of uplink to downlink slots in each frame 202 and provide control information to the BPFP module 935 to assist its bandwidth allocation functions. A node state management module 1040 stores and utilizes information about each node to provide input into numerous control functions, such as bandwidth allocation, QoS protocol, transmission signal optimization, connection identification, and many others. As mentioned before, these exemplary controls may be utilized in embodiments practicing the current invention, but many other functions may also exist and are not mentioned here.

Figure 11:
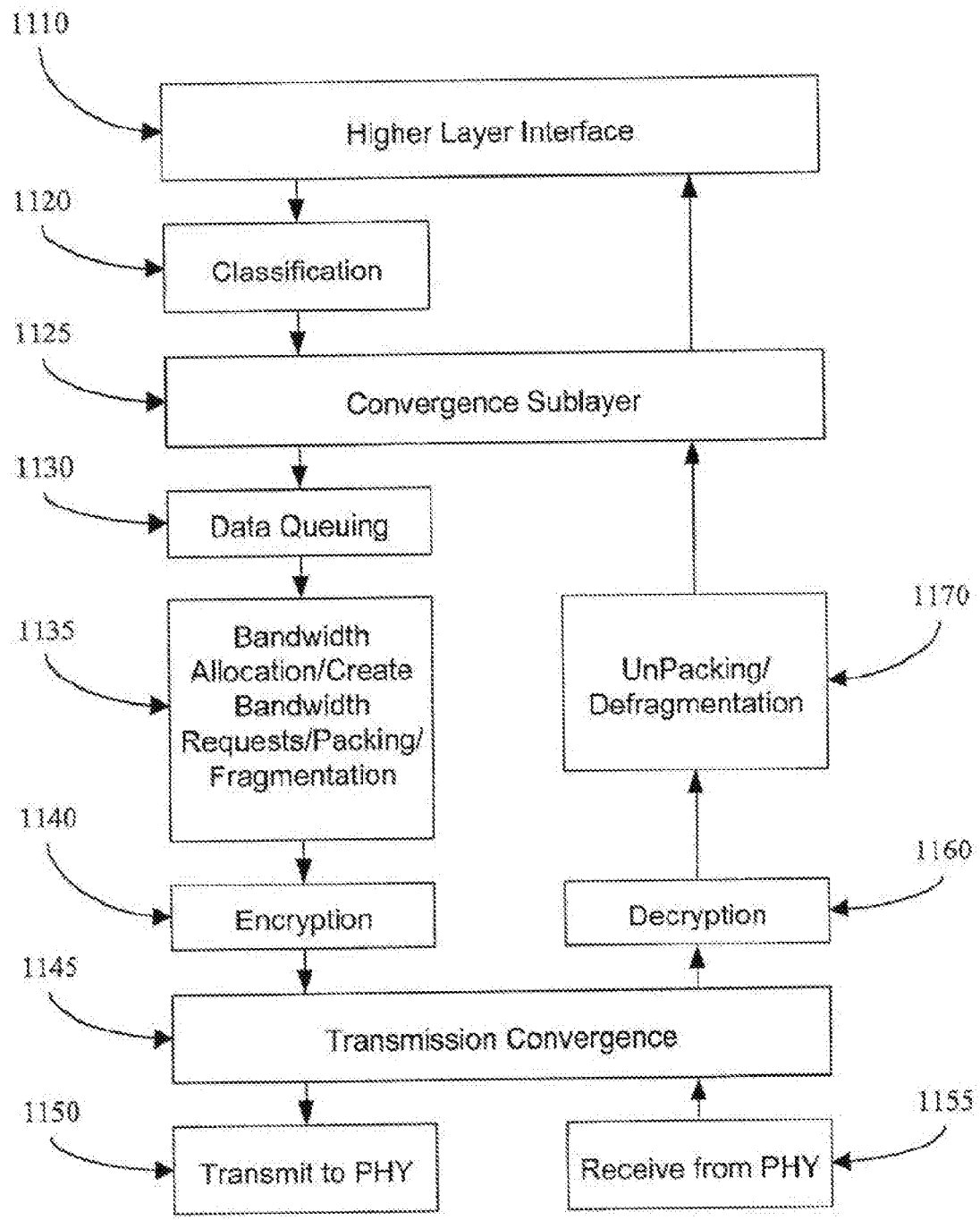
FIG. 11 is a functional block diagram of components that process and transfer data in an exemplary node communications processor.

FIG. 11 is a functional block diagram of components that process and transfer data in an exemplary node communications processor 32. FIG. 11 is a high level diagram of those node communications processor functional components that process and transfer SDUs from the users to the data sources and vice versa. The higher layer interface 1110 receives the SDUs that come to the node from the various connections via the connection interface. Alternatively, the higher layer interface 1110 may be part of the connection interface. The higher layer interface 1110 transfers the information to a classification module 1120 that determines the characteristics of the SDUs to be forwarded to the base station. This determination is accomplished using control protocols unique to each particular system and provides classification data necessary to correctly transfer each SDU to its respective data source. As stated above, the classification data is forwarded to other communications processor modules to facilitate functions such as queuing, packing, fragmentation and assigning proper PDU header characteristics. The SDUs are then transferred to the convergence sublayer 1125 for convergence subprocessing. As discussed above, convergence subprocessing allows various connection types from higher level communications access points to interface with the lower layers of the communications system. The convergence subprocesses of the node are similar to the convergence subprocesses previously described with respect to the base station. After convergence, the user data is transferred to the queuing module 1130 for arrangement and storing, similar to that in the base station described above, in preparation for transfer to the bandwidth allocation/create bandwidth request/packing/fragmentation (BCPF) module 1135. This module sorts data according to connection type and various types of priority information stored within the system to determine queuing order of the various data packages. The data packages are then sequentially fitted into PDU packets as previously discussed. Again, the data packets are advantageously packed and fragmented in a coordinated manner and in the most efficient way possible to maximize the bandwidth available from frame-to-frame.

Again, it is advantageous to incorporate the packing and fragmentation processes with the bandwidth allocation process so as to maximize the flexibility, efficiency and effectiveness of both fragmentation and packing.

The SDUs, after data queuing 1130 and conversion into PDUs by BCPF module 1135 processing, are transferred to the encryption module 1140. The encryption module can encrypt the PDUs for secure transmission, in a similar manner as that described above for the base station. Encrypted PDUs are then transmitted to the physical layer by undergoing a TC process in transmission convergence module 1145, similar to that described above in producing TDUs. Transmission to the physical layer is completed by physical layer module 1150, which maps the TDUs to the PIs as before. Upon transmission to physical layer, the PIs are then ready for transmission via modem, IF/RF converter and antenna to the base station, where they are processed as previously discussed and then transferred to the appropriate data source.

When data on the downlink is transmitted from the base station to the various nodes, it is received via antenna and processed by IF/RF converter modem, if such an embodiment is utilized, and arrives at the receive from physical layer module 1155. Here, the data is received as PIs and is converted to TDUs and then undergoes a transmission convergence 1145, as previously discussed, converting received TDUs into encrypted PDUs. The encrypted PDUs are then passed through decryption module 1160 and then are processed by unpacking and defragmentation module 1170, which converts them back into the SDU format they were in when they arrived at the base station from the data source. Upon conversion back into the SDU format, the SDU packets then undergo a convergence process in the convergence sublayer module 1125 for communications via the higher layer interface 1110. In the higher layer interface 1110, the SDUs are directed to their respective connections through the connection interface, from where they are passed on to their respective connections, or users.

Figure 12:
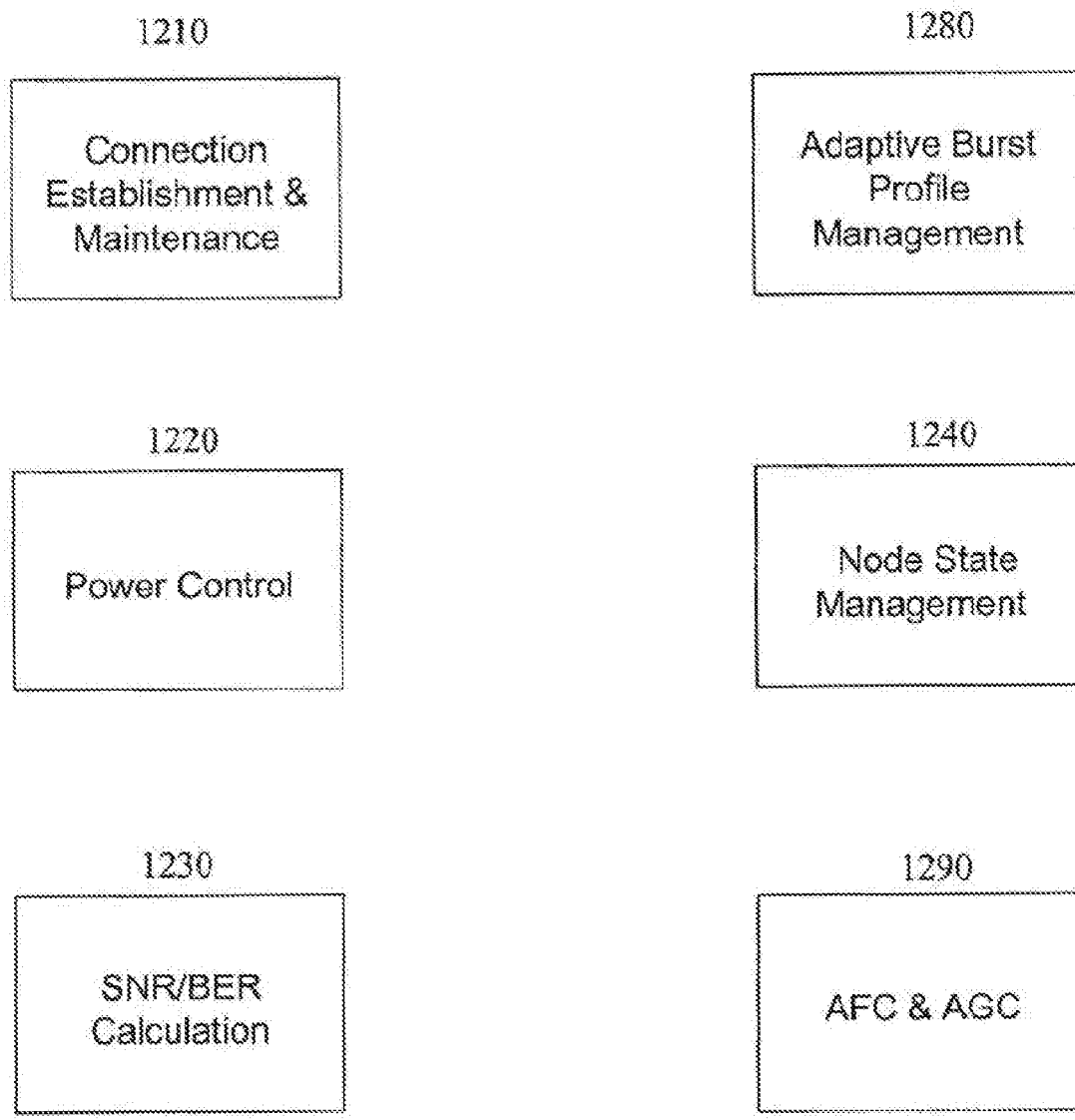
FIG. 12 is functional block diagram of components that handle control functions in an exemplary node communications processor.

FIG. 12 is functional block diagram of components that handle control functions in an exemplary node communications processor. FIG. 12 illustrates some of the communications control modules that may be used by the nodes in establishing and maintaining transmission links with the base station. As mentioned before, these exemplary communications control modules are only provided for illustrative purposes, as more or fewer may be used. It is understood that other functions may be accomplished by the node communications processor that are not included in the subsequent discussion, yet those of skill in the art understand those functions to be incorporated herein. Similar to that of the base station, a connection establishment and maintenance module 1210 may be utilized to establish the communications link between the node and the base station. The node's communications processor may include other modules that also correspond closely to the base station communications control modules and perform similar functions. These modules may include a power control module 1220, a SNR/BER calculation module 1230, a node state management module 1240, and an adaptive burst profile management module 1280, among others.

These modules can perform functions that correspond to, and are complimentary with those of the base station communications control modules described above. The power control module 1220 may utilize signals sent by the base station to adjust the node's transmission power level as necessary to optimize the communications link's performance. The SNR/BER calculation module 1230 can interact with signals from its complimentary base station control module to monitor the performance of the communications link and to request the base station to adjust the downlink transmission characteristics as necessary to optimize that performance. The node state management module 1240 can maintain information about the node and the communications link between the node and the base station and may transfer information as necessary to update such information that is stored in the base station. An adaptive burst profile management module 1280 may also be utilized to correspond with that of the base station to adaptively change uplink burst profile. In addition, the node communications controls may also include various operational parameter control modules such as automatic frequency control (AFC) and automatic gain control (AGC) control module 1190 that can control various settings of the modem used in the communications system.

Figure 13:
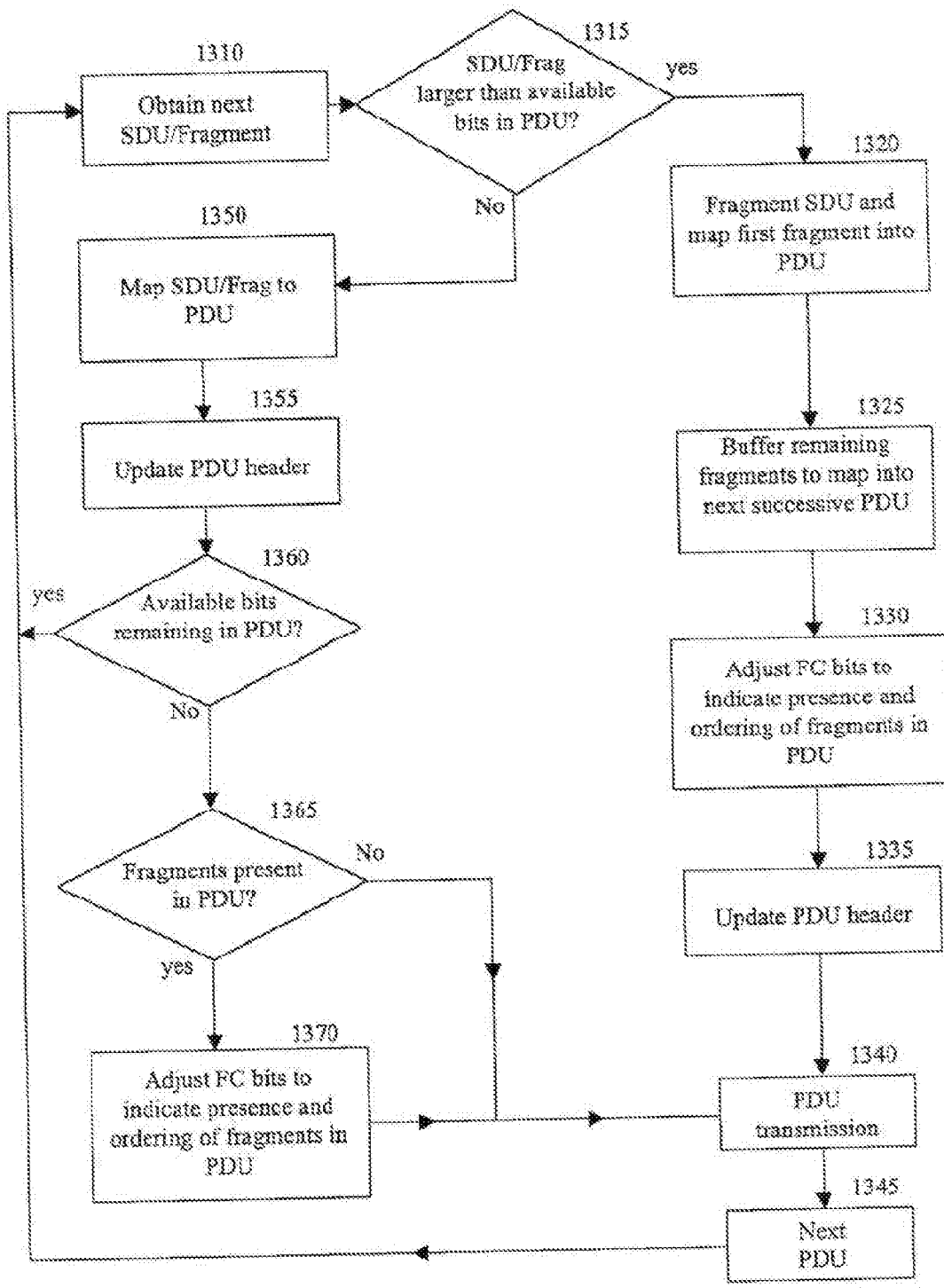
FIG. 13 is a flow chart illustrating the steps of an exemplary process for forming PDUs from incoming SDUs.

FIG. 13 is a flow chart illustrating the steps of an exemplary process for forming PDUs from incoming SDUs. The process 1300 in FIG. 13 illustrates the coordination of the fragmentation and packing processes that the communications processors may utilize in one embodiment of both the base station and the nodes. An SDU or fragment that is next in the queue is identified and obtained at state 1310; then the process moves to decision state 1315. At decision state 1315, the communications processor decides whether the SDU or current fragment is larger than the available bits in the payload of the current PDU. If the current SDU or fragment is larger than the available PDU payload, the process moves to state 1320. At state 1320, the SDU or fragment is fragmented and mapped to fill the current PDU. The process then moves to state 1325. At state 1325, the remaining fragment of the current SDU is buffered and can be mapped into the next successive PDU, and the process moves to state 1330. At state 1330, the fragmentation control bits in the PDU header are adjusted to indicate the presence and orientation of fragments in the PDU. The process then moves to state 1335 where the PDU header is updated to incorporate information regarding the payload it carries, which may include the length and the presence or absence of a packing subheader. The process then moves to state 1340. At state 1340, the PDU is mapped to the physical layer and transmitted either from the node to the base station, or from the base station to the node. The process then moves to state 1345. State 1345 is a transitional state to the next PDU so that the next PDU is formed in the communications processor. The process then moves back to state 1310 where the next SDU or fragment in the queue is mapped according to the same process 1300.

Going back to decision state 1315, if the current SDU or fragment is not larger than the available bits in the current PDU payload, then the process moves to state 1350. At state 1350, the SDU or fragment is mapped to the current PDU. The PDU header is then updated in state 1355. The process then moves to decision state 1360. At decision state 1360, the communications processor determines whether there are any available bits remaining in the current PDU. If there are available bits, the process then returns to state 1310 to obtain the next SDU or fragment in the queue. If there are no more available bits in the PDU, then the process moves to decision state 1365. At decision state 1365, the communications processor determines whether there are fragments present in the PDU. If there are fragments present in the PDU, the process then moves to state 1370. The fragment control bits are then adjusted to indicate the presence and orientation of those fragments. The process then moves to state 1340 for PDU transmission and then returns, as before, via state 1345 to the beginning state 1310 where the next SDU or fragment is queued up. If there were no fragments present in the present PDU at state 1365, then the fragment control bits are adjusted to indicate such absence and the process moves from state 1365 to state 1340 for PDU transmission and then onto state 1345 to create the next PDU. Through this process, PDUs are created from SDUs via a fragmentation and coordinated packing process. By coordinating the fragmenting and packing processes that occur in the bandwidth allocation process, rather than the convergence sublayer, the advantages of packing and fragmentation are optimized and maintained whereas the efficiency gained by both processes may be lost if they were performed independently of one another.

Figure 14:
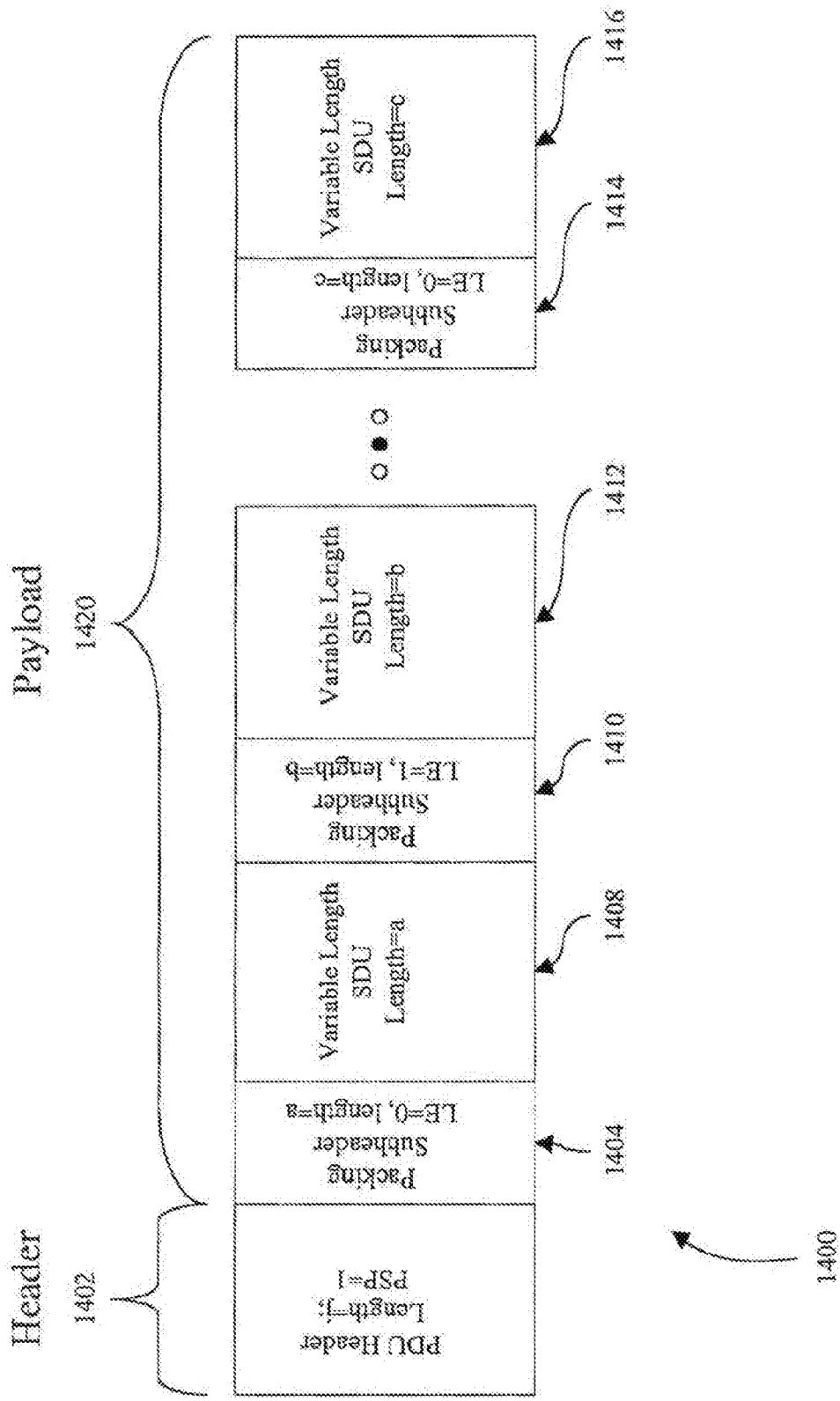
FIG. 14 is an illustration demonstrating the relationship between the PDU header, the payload and the PDU subheader.

FIG. 14 is an illustration demonstrating the relationship between the PDU header, the payload and the packing subheader. FIG. 14 illustrates the packing of multiple variable length SDUs into a single PDU. The embodiment illustrated in FIG. 14 is intended to correspond with the PDU header described previously with respect to FIG. 8. However, only the length field and the packing subheader fields described above are germane to the current discussion. An exemplary PDU 1400 contains two main sections, a PDU header section 1402 and a PDU payload section 1420. The PDU header section 1402 can include the various components that make up the header section described in FIG. 8. As can be seen in FIG. 14, the parts of the PDU header section 1402 illustrated include a length field 820 and a packing subheader present 819 field. The PDU length field 820 has a sample entry of J and a sample packing subheader present entry 819 of 1 meaning, in this case, that the length of the payload is going to be J and there are packing subheaders 1404, 1410, 1414, present in the payload. Packing subheaders 1404, 1410, 1414, occur in the payload of the PDU packet 1400 and they can occupy a variable number of bits depending on the type of information they contain and the lengths of the corresponding SDUs that follows the packing subheaders 1404, 1410, 1414.

The packing subheaders 1404, 1410, 1404, may include, among other items, a length extension item (LE) and a length item. The length extension item indicates the quantity of bits required in the subheader length field to indicate the length of the SDU that follows the subheader. The length item indicates the length of the SDU. There may be multiple variable length SDUs between the second variable length SDU 1412 and a final variable length SDU 1416; or there may be no more SDUs between the two. The PDU header 1402 contains a length field J that comprises the entire length of the payload 1420. That payload 1420 includes the length of the first SDU 1408 (length a), the length of the second SDU 1412 (length b), the length of the last SDU 1416 (length c) as well as the lengths of the respective packing subheaders 1404, 1410, 1414, and any other SDU lengths and their subheaders that are in the payload 1420. By this system, various lengths can be utilized and accommodated while minimizing the amount of payload 1420 bits that are utilized in the packing subheaders 1404, 1410, and 1440. Because the packing subheader size can be variable depending on the type of information it contains and the length of the SDU with which it corresponds, the amount of payload lost, or that is not dedicated to carrying data, is minimized, while still allowing the PDU to contain variable length SDUs in the most efficient manner.

Through the components and functions described in the preceding paragraphs, a system and method are described that utilize packing and fragmentation in an efficient manner. In certain embodiments the packing and fragmentation processes are implemented in a cooperative manner to fully realize the benefits of both. Additionally, it is advantageous to coordinate packing and fragmentation with bandwidth allocation so that a communications system can be most flexible and able to capitalize on the circumstances that may exist in any one communications cycle. This system also utilizes a method of packing variable length SDUs that is advantageously adaptive. Through the use of variable length packing subheaders the amount of available payload that is lost in describing the data carried within it, or cell tax, is minimized further improving the effectiveness and efficiency of the packing process. It is understood that the description was mainly made with respect to a wireless data communications system. However, as stated previously, this description applies to all packeted data communications systems and it may be advantageously utilized in any one of the previously mentioned types of communications systems.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

The invention claimed is:

1. A mobile subscriber unit for a wireless communications system operable to pack and fragment variable length service data units (SDUs) into variable length protocol data units (PDUs), the mobile subscriber unit comprising:
   a processor addressable storage medium;
   at least one processor in communication with the processor addressable storage medium and configured to:
   receive a bandwidth allocation for an uplink frame;
   determine a length of a PDU;
   pack data of a first SDU into a payload area of the PDU of the uplink frame, the PDU of the uplink frame of a length different than the length of another PDU of another uplink frame;
   on a condition that data of a second SDU fits in a remaining payload area of the PDU, pack the data of the second SDU into the remaining payload area of the PDU, the second SDU of a length different than the length of the first SDU; and
   on a condition that the data of the second SDU does not fit in the remaining payload area of the PDU, pack a first fragment of the data of the second SDU into the remaining payload area of the PDU and pack a second fragment of the data of the second SDU into a payload area of a PDU of a second uplink frame.

2. A mobile subscriber unit as claimed in claim 1, wherein the at least one processor is further configured to:
   insert a packing information in the PDU for the SDUs packed in the PDU, the packing information comprises a fragmentation control field indicating whether the corresponding service data unit is a first fragment, a continuing fragment, a last fragment, or an un-fragmented SDU.

3. A mobile subscriber unit as claimed in claim 2, wherein the at least one processor is further configured to determine the length of the PDU from a message.

4. A mobile subscriber unit as claimed in claim 1, wherein the at least one processor is further configured to prepend a header to the PDU to indicate the length of the PDU.

5. A mobile subscriber unit for a wireless communications system operable to pack and fragment variable length service data units (SDUs) into variable length protocol data units (PDUs), the mobile subscriber unit comprising:
   a processor addressable storage medium;
   at least one processor in communication with the processor addressable storage medium and configured to:
   receive a bandwidth allocation for a first uplink frame;
   pack data of a first SDU into a payload area of the PDU of the first uplink frame, the PDU of the first uplink frame of a length different than the length of another PDU of another uplink frame;
   pack at least a portion of data of a second SDU into the payload area of the PDU of the first uplink frame, the second SDU of a length different than the length of the first SDU; and
   on a condition that all the data of the second SDU does not fit in the payload area of the PDU of the first uplink frame, pack at least a portion of remaining data of the second SDU into a payload area of a PDU of a second uplink frame.

6. A mobile subscriber unit as claimed in claim 5, wherein the at least one processor is further configured to:
insert a packing information in the PDU of the first uplink frame for the SDUs packed in the PDU of the first uplink frame, the packing information comprises a fragmentation control field indicating whether the corresponding service data unit is a first fragment, a continuing fragment, a last fragment, or an un-fragmented SDU.

7. A mobile subscriber unit as claimed in claim 6 wherein the at least one processor is further configured to prepend a header to the PDU of the first uplink frame to indicate the length of the PDU of the first uplink frame.

8. A method for operating a mobile subscriber unit in a wireless communications system and operable to pack and fragment variable length service data units (SDUs) into variable length protocol data units (PDUs), the method comprising:
receive a bandwidth allocation for an uplink frame;
determine a length of a PDU;
packing data of a first SDU into a payload area of the PDU of the uplink frame, the PDU of the uplink frame of a length different than the length of another PDU of another uplink frame;
on a condition that data of a second SDU fits in a remaining payload area of the PDU, pack the data of the second SDU into the remaining payload area of the PDU, the second SDU of a length different than the length of the first SDU;
on a condition that the data of the second SDU does not fit in the remaining payload area of the PDU, pack a first fragment of the data of the second SDU into the remaining payload area of the PDU; and
on a condition that all the data of the second SDU does not fit in the payload area of the PDU, pack at least a portion of remaining data of the second SDU into a payload area of a PDU of a second uplink frame.

9. A method as claimed in claim 8, further comprising:
inserting a packing information in the PDU for the SDUs packed in the PDU, the packing information comprising a fragmentation control field indicating whether the corresponding service data unit is a first fragment, a continuing fragment, a last fragment, or an un-fragmented SDU.

10. A method as claimed in claim 9 further comprising prepending a header to the PDU to indicate the length of the PDU.

11. A method as claimed in claim 8 further comprising determining the length of the PDU from a received message.

* * * * *